United States Patent
Lee et al.

(10) Patent No.: US 10,946,337 B2
(45) Date of Patent: Mar. 16, 2021

(54) WATER TREATMENT APPARATUS

(71) Applicant: COWAY CO., LTD., Chungcheongnam-do (KR)

(72) Inventors: Jong-Hwan Lee, Seoul (KR); Jung-Hwan Lee, Seoul (KR); Hyun-Soo Shin, Seoul (KR); Tae-Seong Kwon, Seoul (KR); Hyoung-Min Moon, Seoul (KR); Jung-Hun Lee, Seoul (KR); In-Du Choi, Seoul (KR); Sang-Hyeon Kang, Seoul (KR)

(73) Assignee: Coway Co., Ltd

( * ) Notice: Subject to any disclaimer, the term of this patent is extended or adjusted under 35 U.S.C. 154(b) by 0 days.

(21) Appl. No.: 15/541,202

(22) PCT Filed: Dec. 29, 2015

(86) PCT No.: PCT/KR2015/014383
§ 371 (c)(1),
(2) Date: Jun. 30, 2017

(87) PCT Pub. No.: WO2016/108565
PCT Pub. Date: Jul. 7, 2016

(65) Prior Publication Data
US 2017/0368503 A1    Dec. 28, 2017

(30) Foreign Application Priority Data

Dec. 30, 2014  (KR) .................. 10-2014-0192911
Dec. 30, 2014  (KR) .................. 10-2014-0192914

(51) Int. Cl.
*B01D 61/02*    (2006.01)
*B01D 61/08*    (2006.01)
(Continued)

(52) U.S. Cl.
CPC .......... *B01D 61/025* (2013.01); *B01D 61/08* (2013.01); *B01D 61/10* (2013.01); *B01D 61/12* (2013.01);
(Continued)

(58) Field of Classification Search
None
See application file for complete search history.

(56) References Cited

U.S. PATENT DOCUMENTS 3,365,061 A * 1/1968 Bray ..................... B01D 61/08
                                            210/130
4,176,063 A   11/1979 Tyler
(Continued)

FOREIGN PATENT DOCUMENTS

CN          1231882       10/1999
CN        202089841       12/2011
(Continued)

OTHER PUBLICATIONS

Chinese Office Action dated Dec. 11, 2018 issued in counterpart application No. 201580072006.2, 6 pages.
(Continued)

*Primary Examiner* — Ana M Fortuna
(74) *Attorney, Agent, or Firm* — The Farrell Law Firm, P.C.

(57) ABSTRACT

Disclosed is a water treatment apparatus which can extract clean water by means of the pressure of raw water. The disclosed water treatment apparatus comprises: a filter part which filters raw water; a storage part which stores clean water filtered by passing through at least a part of the filter part, the storage part having a first chamber and a second chamber of which the volume changes according to a change in the volume of the first chamber; an extraction part which is installed so as to provide the filtered clean water to a user;
(Continued)

and an air supply part which is installed on a flow path connected to the storage part in order to supply air to either one of the first chamber or the second chamber of the storage part.

12 Claims, 27 Drawing Sheets

(51) Int. Cl.
*B01D 61/12* (2006.01)
*B01D 61/10* (2006.01)
*B01D 65/02* (2006.01)
*C02F 103/02* (2006.01)
*E03C 1/02* (2006.01)
*C02F 5/10* (2006.01)
*C02F 1/44* (2006.01)

(52) U.S. Cl.
CPC .............. *B01D 65/02* (2013.01); *C02F 1/441* (2013.01); *C02F 5/10* (2013.01); *B01D 2311/04* (2013.01); *B01D 2311/06* (2013.01); *B01D 2313/18* (2013.01); *B01D 2313/24* (2013.01); *B01D 2313/50* (2013.01); *C02F 2103/023* (2013.01); *C02F 2209/05* (2013.01); *C02F 2307/06* (2013.01); *E03C 1/02* (2013.01)

(56) References Cited

U.S. PATENT DOCUMENTS

| | | | | |
|---|---|---|---|---|
| 4,718,550 A * | 1/1988 | Johnson | ............... | G11B 23/023 206/387.13 |
| 4,977,553 A * | 12/1990 | Yokogawa | ......... | G11B 7/00736 369/44.26 |
| 4,978,550 A | 12/1990 | Menon et al. | | |
| 6,093,312 A * | 7/2000 | Boulter | ................ | B67D 1/0009 210/86 |
| 6,110,360 A * | 8/2000 | Hart, Jr. | ................. | B01D 61/08 210/110 |
| 6,179,613 B1 | 1/2001 | Yang | | |
| 6,334,951 B1 * | 1/2002 | Cheng | .................... | B01D 61/08 210/110 |
| 6,589,426 B1 * | 7/2003 | Husain | ................. | B01D 61/145 210/257.2 |
| 6,764,595 B1 | 7/2004 | Halemba et al. | | |
| 7,303,666 B1 | 12/2007 | Mitsis | | |
| 7,550,084 B2 * | 6/2009 | Schmitt | ................ | B01D 61/025 210/134 |
| 7,837,866 B2 * | 11/2010 | Burrows | ................ | B01D 61/04 210/110 |
| 8,206,581 B2 * | 6/2012 | Richetti | ............... | B01D 61/025 210/137 |
| 8,741,148 B2 * | 6/2014 | Park | ..................... | B01D 61/025 210/652 |
| 2002/0100716 A1 * | 8/2002 | Bosko | .................... | B01D 61/08 210/97 |
| 2003/0019764 A1 * | 1/2003 | Baldwin | ................ | B01D 61/08 205/742 |
| 2003/0178355 A1 | 9/2003 | Beach | | |
| 2007/0256977 A1 * | 11/2007 | Schmitt | ................ | B01D 61/025 210/652 |
| 2010/0116724 A1 * | 5/2010 | Schmitt | ................. | B01D 61/08 210/136 |
| 2013/0048549 A1 * | 2/2013 | Burrows | ................ | B01D 61/04 210/232 |
| 2017/0327273 A1 * | 11/2017 | Lee | ......................... | B29C 49/02 |

FOREIGN PATENT DOCUMENTS

| | | |
|---|---|---|
| CN | 104086013 | 10/2014 |
| KR | 1020060095890 | 9/2006 |
| KR | 1020090117206 | 11/2009 |
| KR | 1020110029396 | 3/2011 |
| KR | 1020130050596 | 5/2013 |
| KR | 1020130073109 | 7/2013 |
| WO | WO 2012/158355 | 11/2012 |

OTHER PUBLICATIONS

European Search Report dated Dec. 15, 2017 issued in counterpart application No. 15875659.3-1370, 8 pages.

* cited by examiner

[Figure 1]
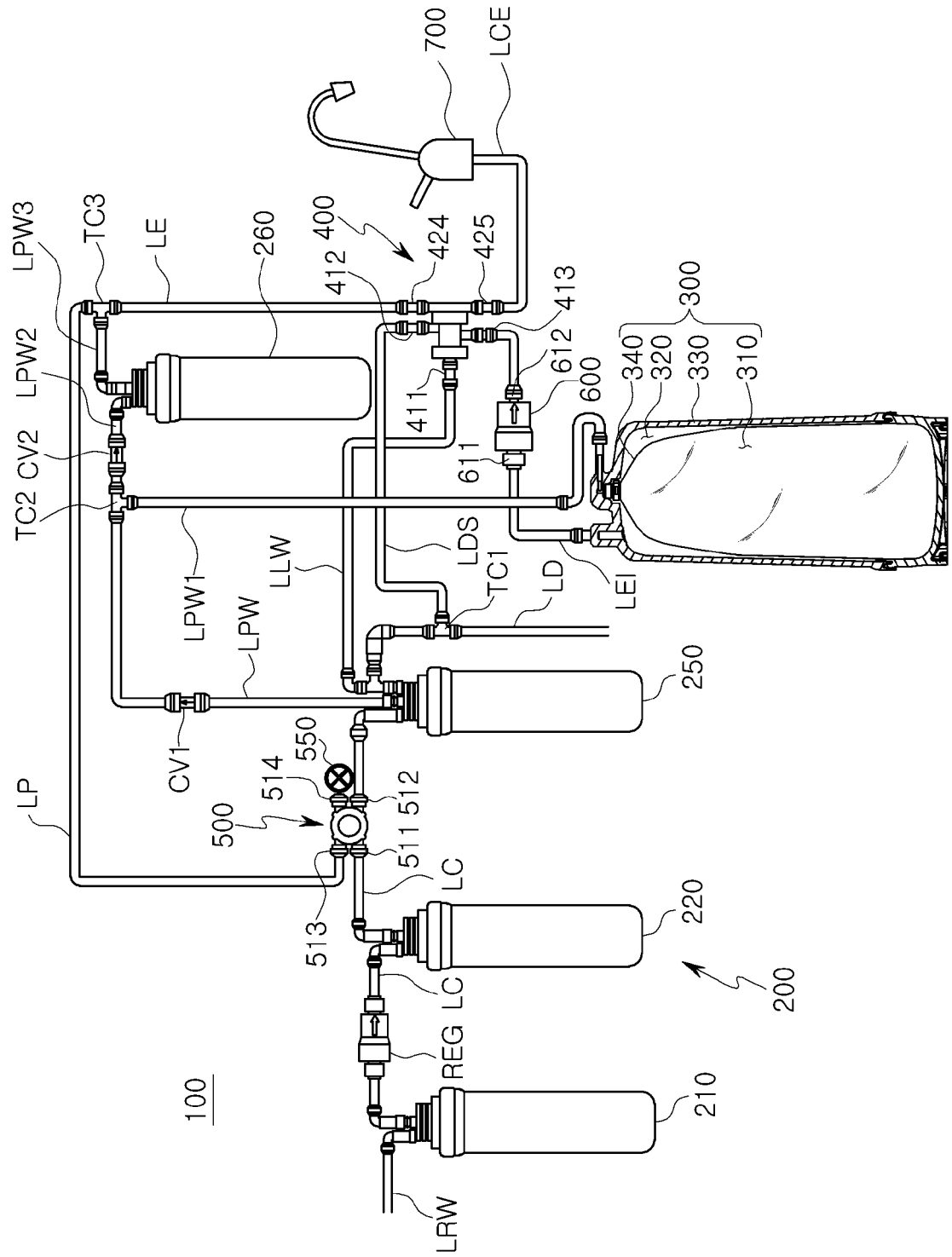

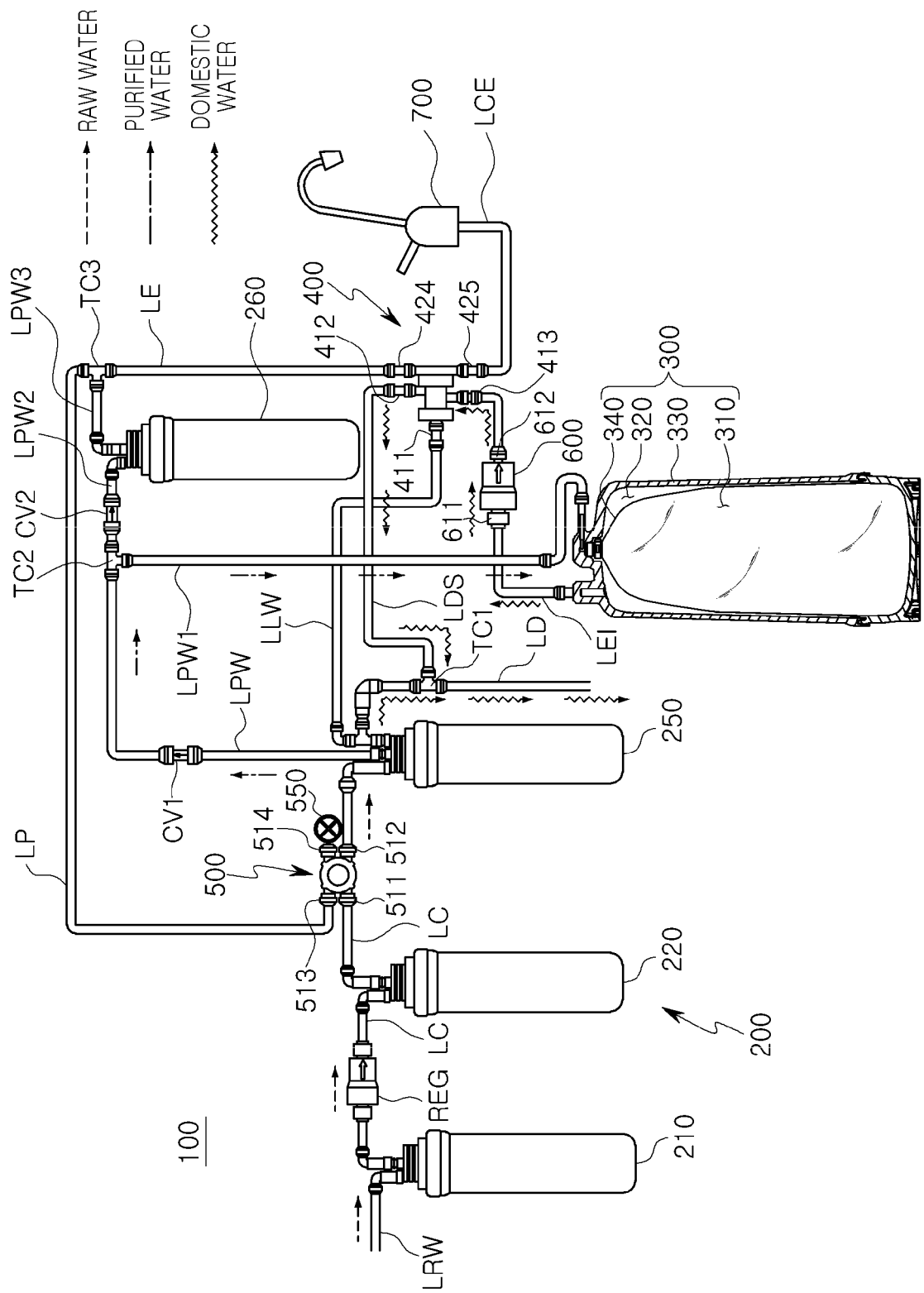
[Figure 2]

[Figure 3]
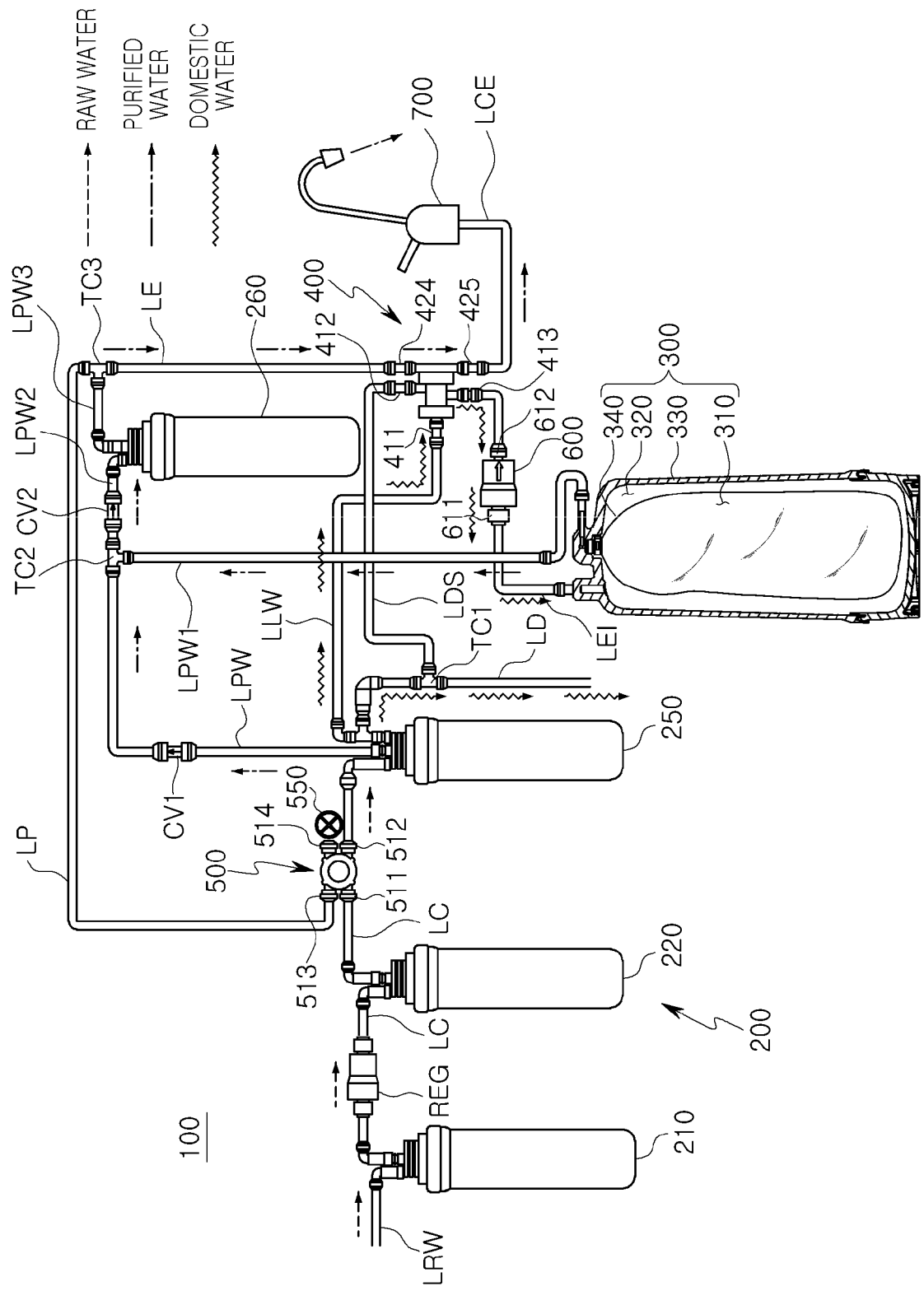

[Figure 4]
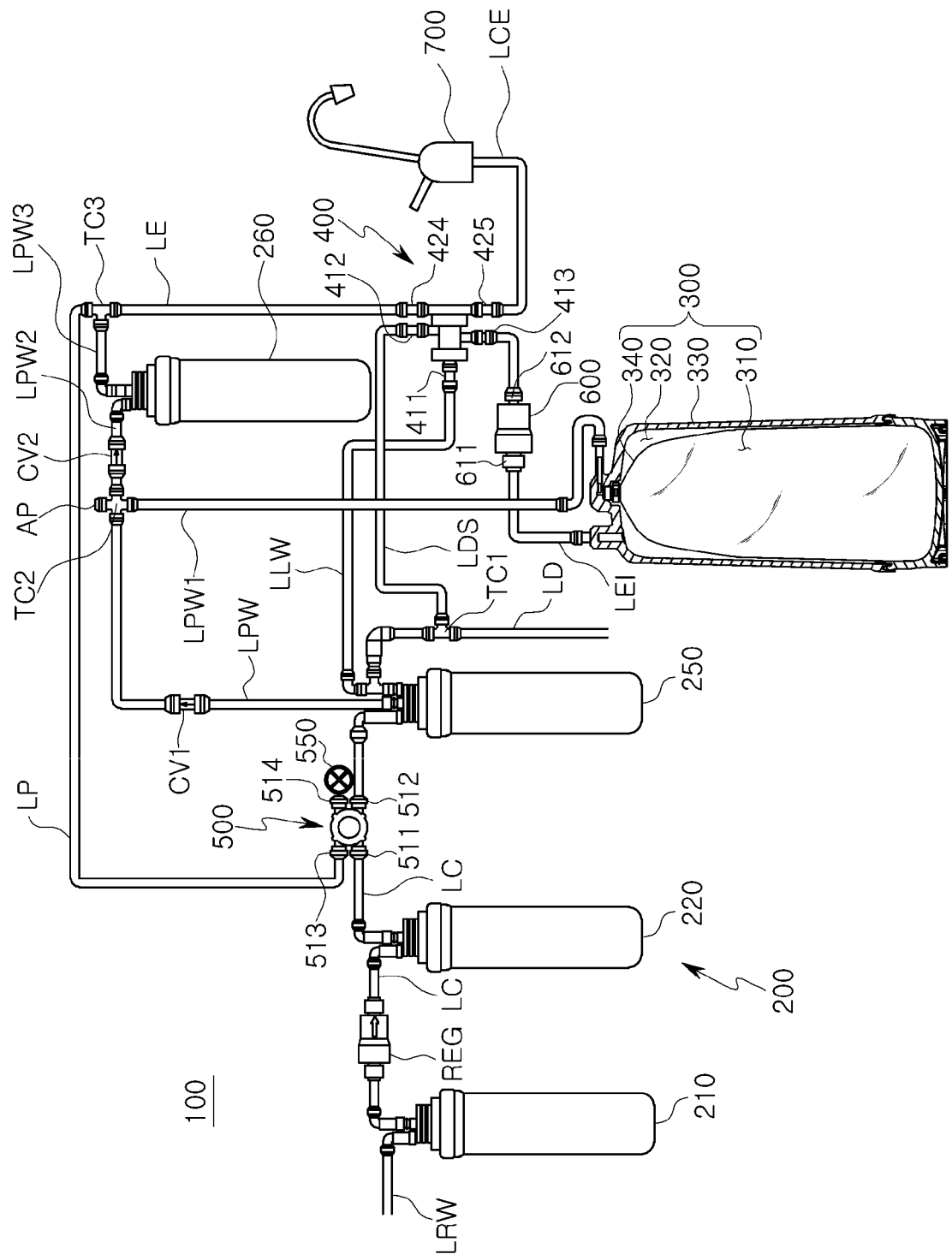

[Figure 5]
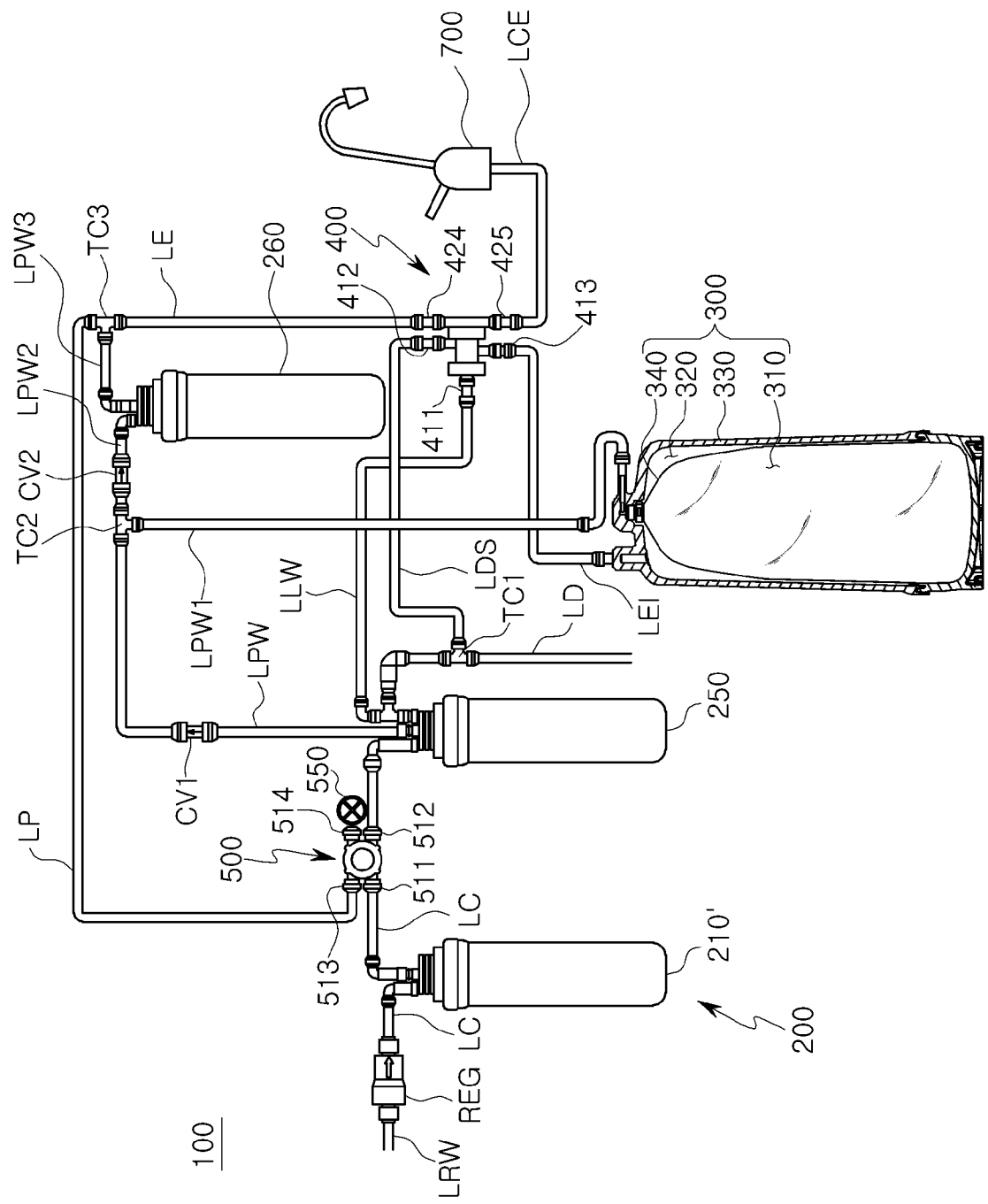

【Figure 6】
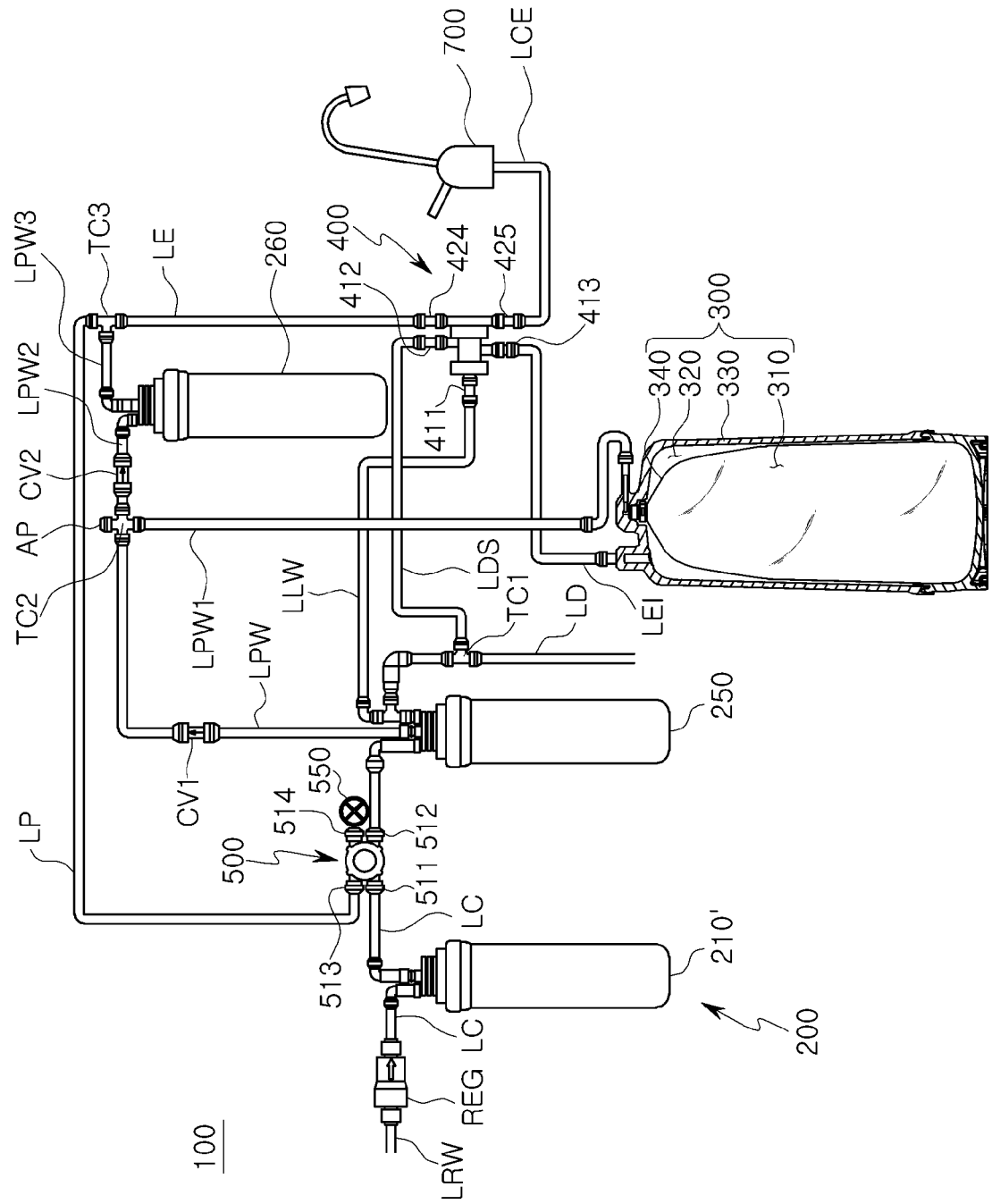

【Figure 7】
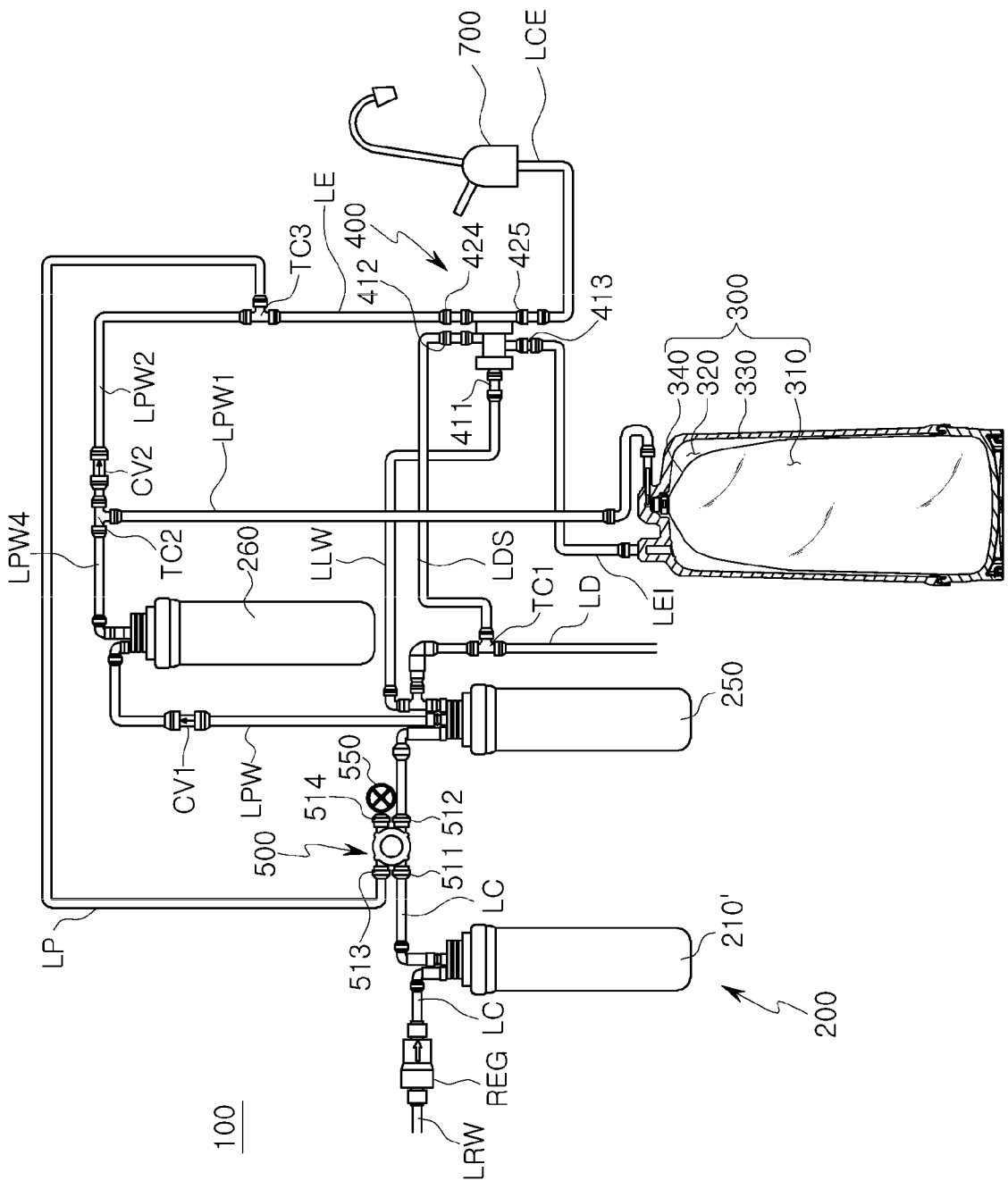

【Figure 8】
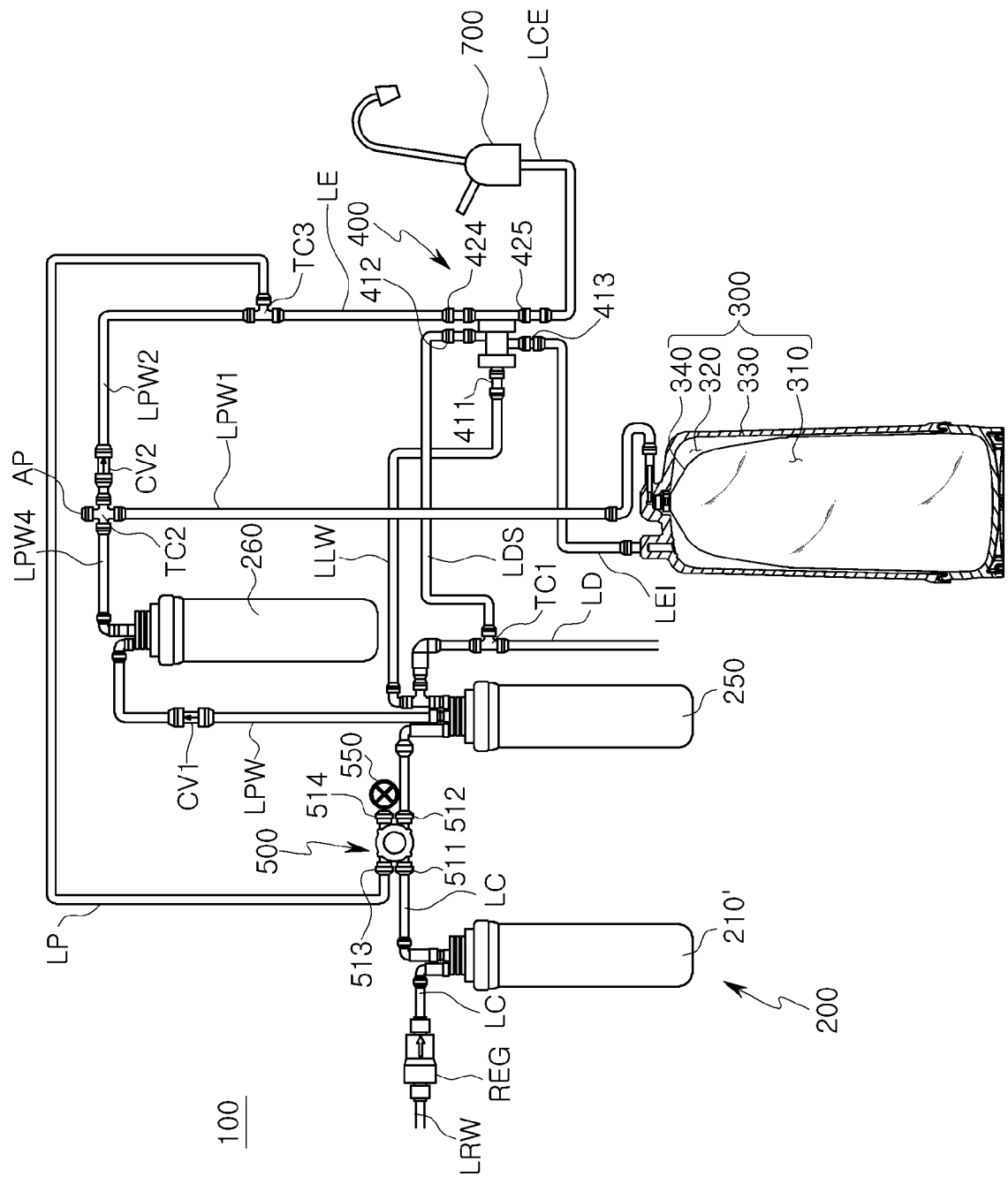

[Figure 9]
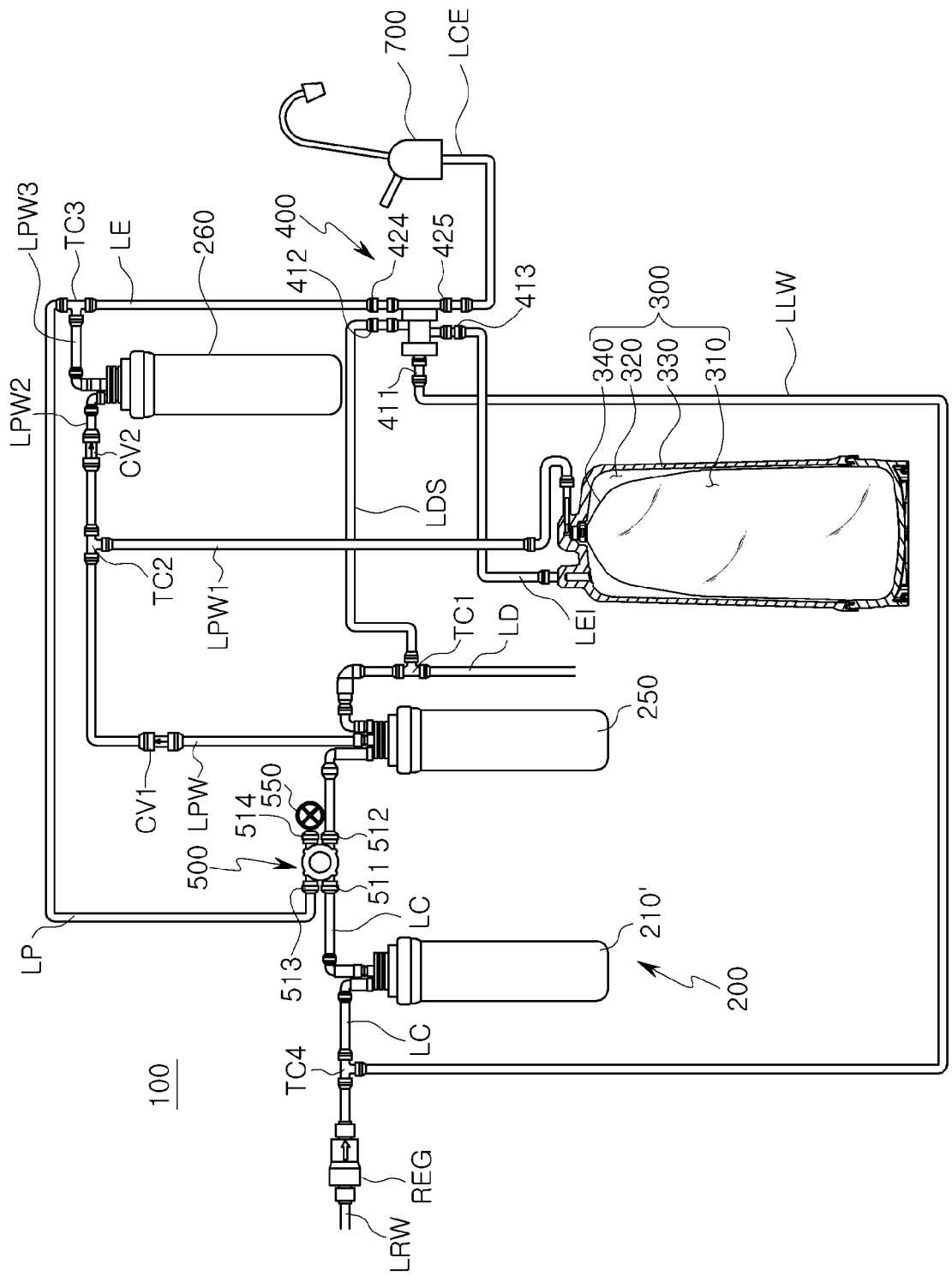

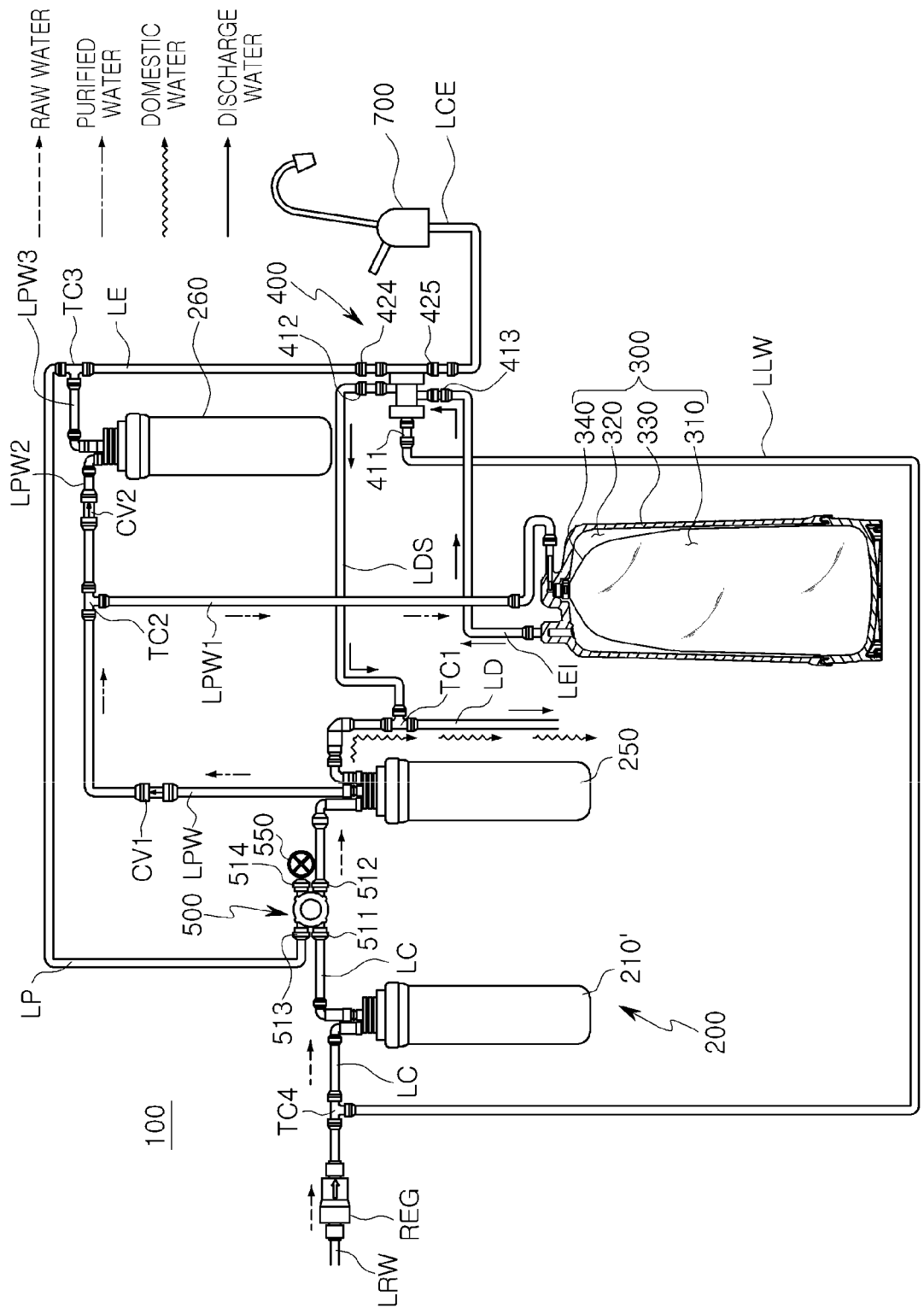
[Figure 10]

【Figure 11】
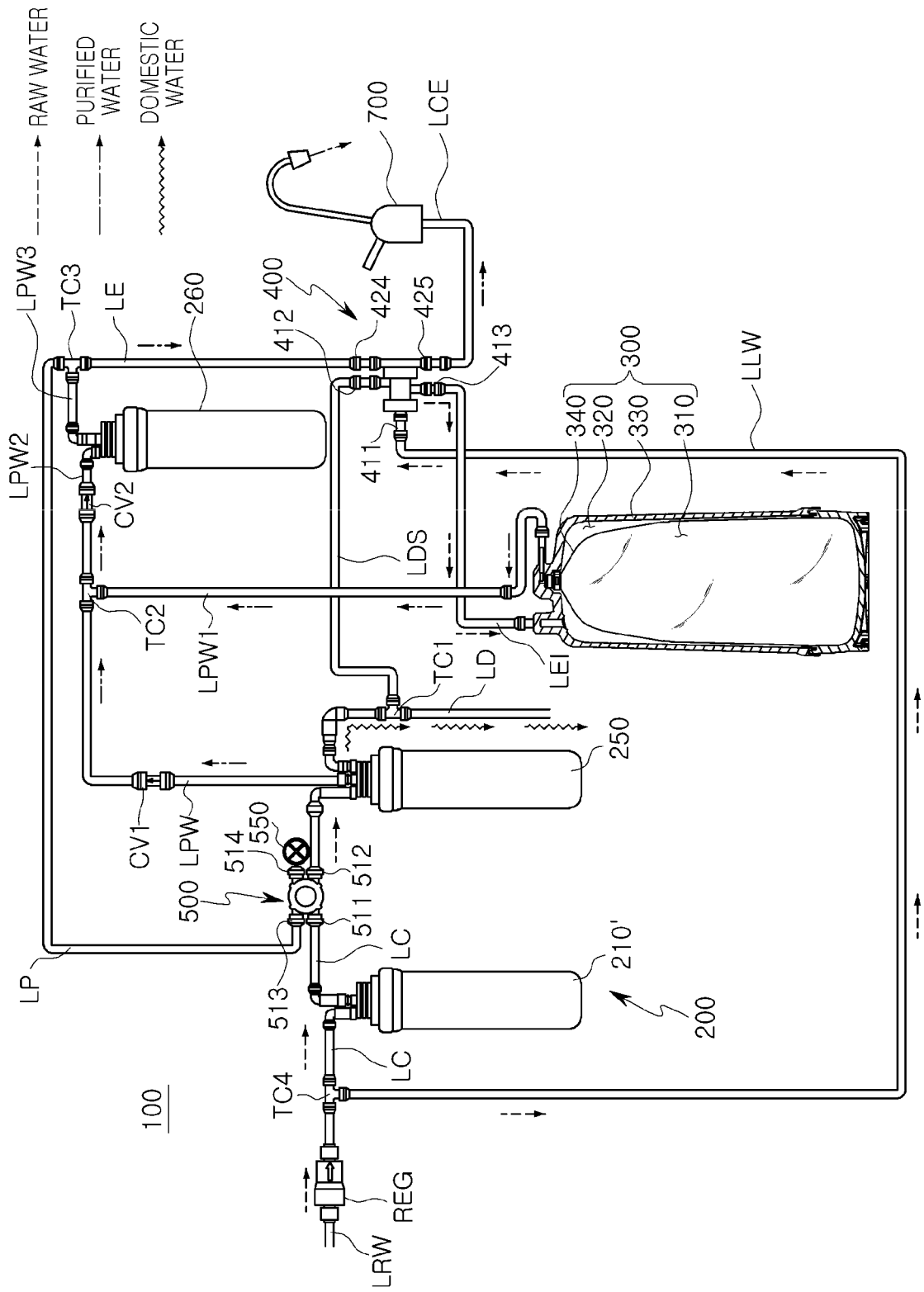

【Figure 12】
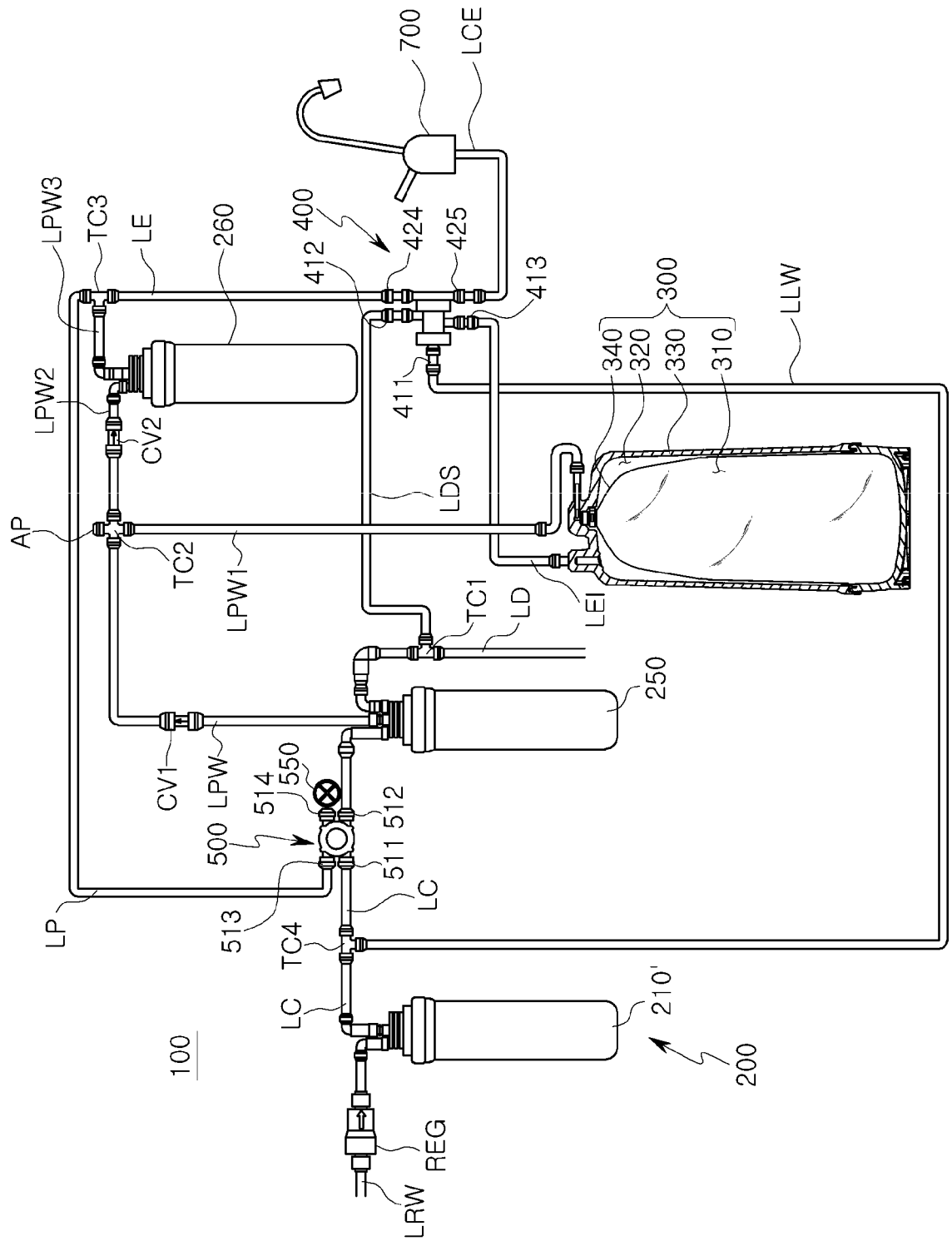

【Figure 13】
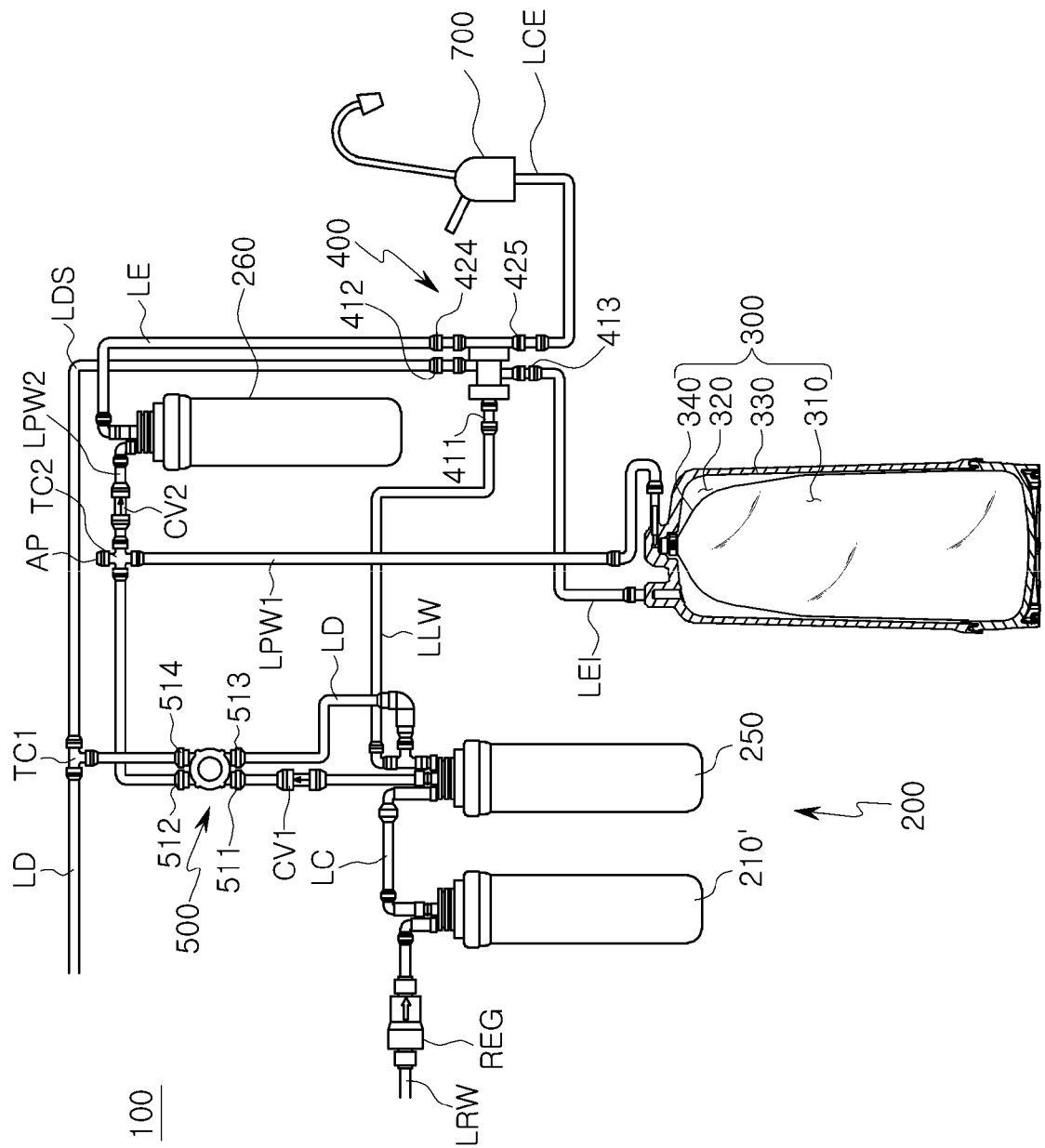

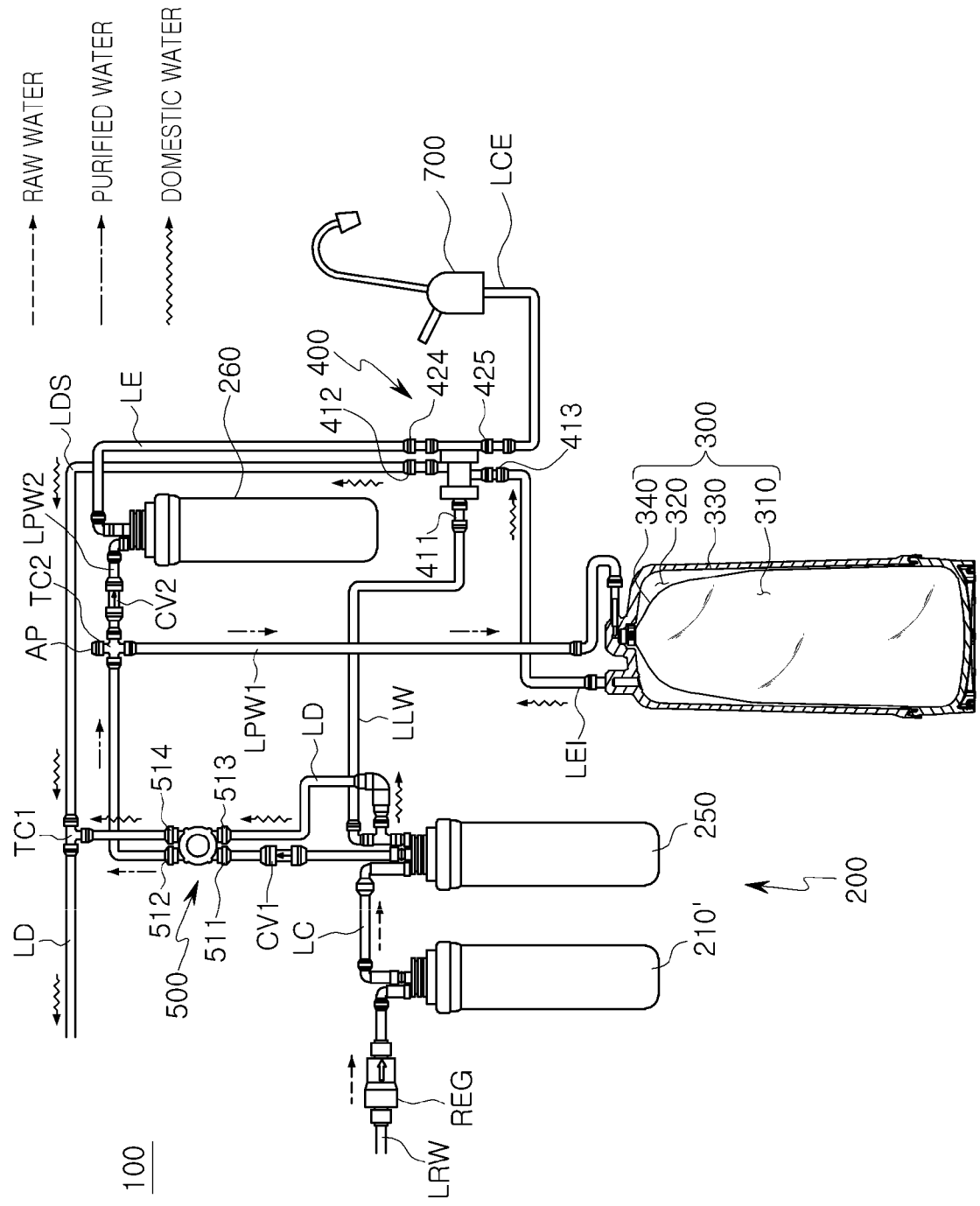
【Figure 14】

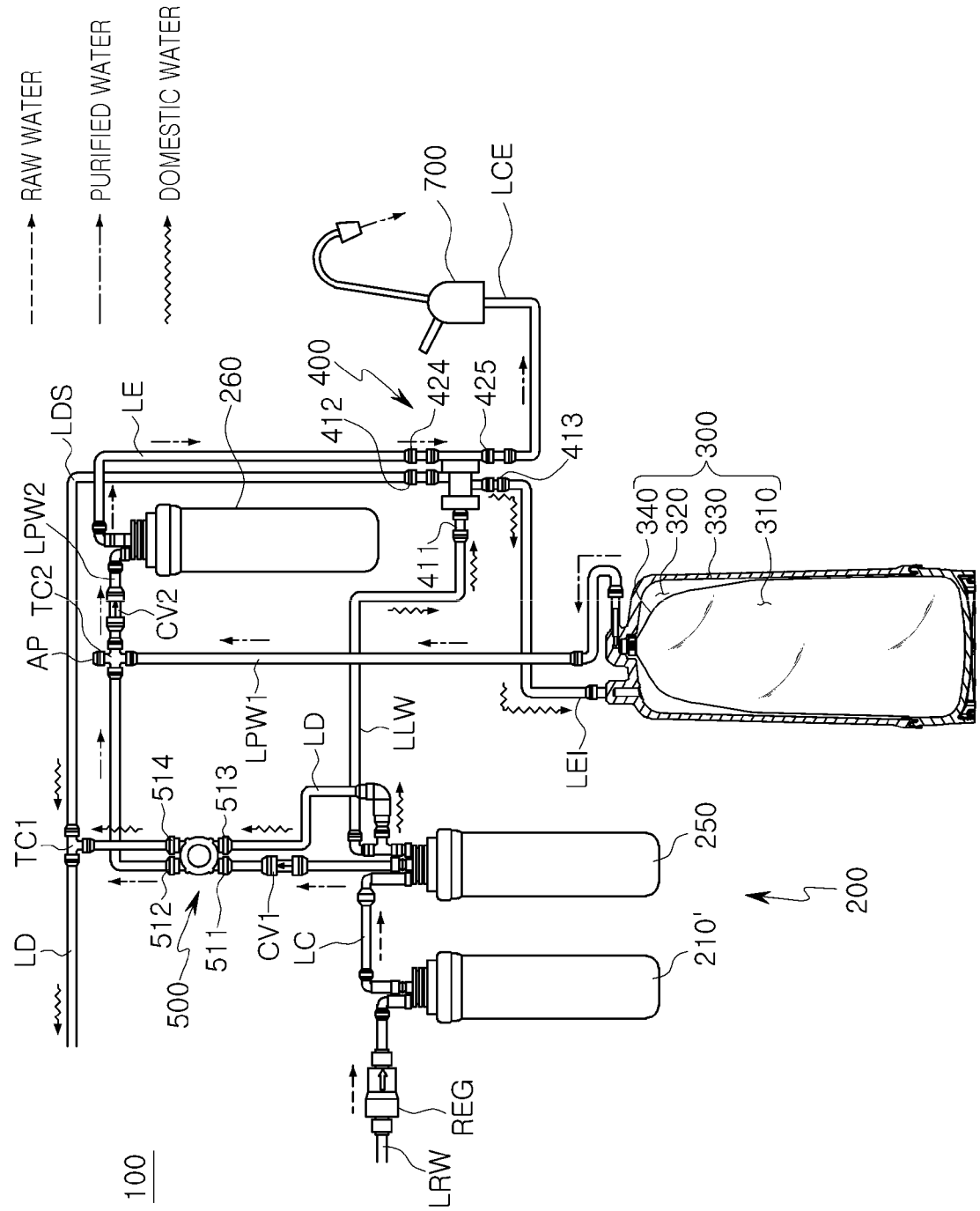
[Figure 15]

[Figure 16]
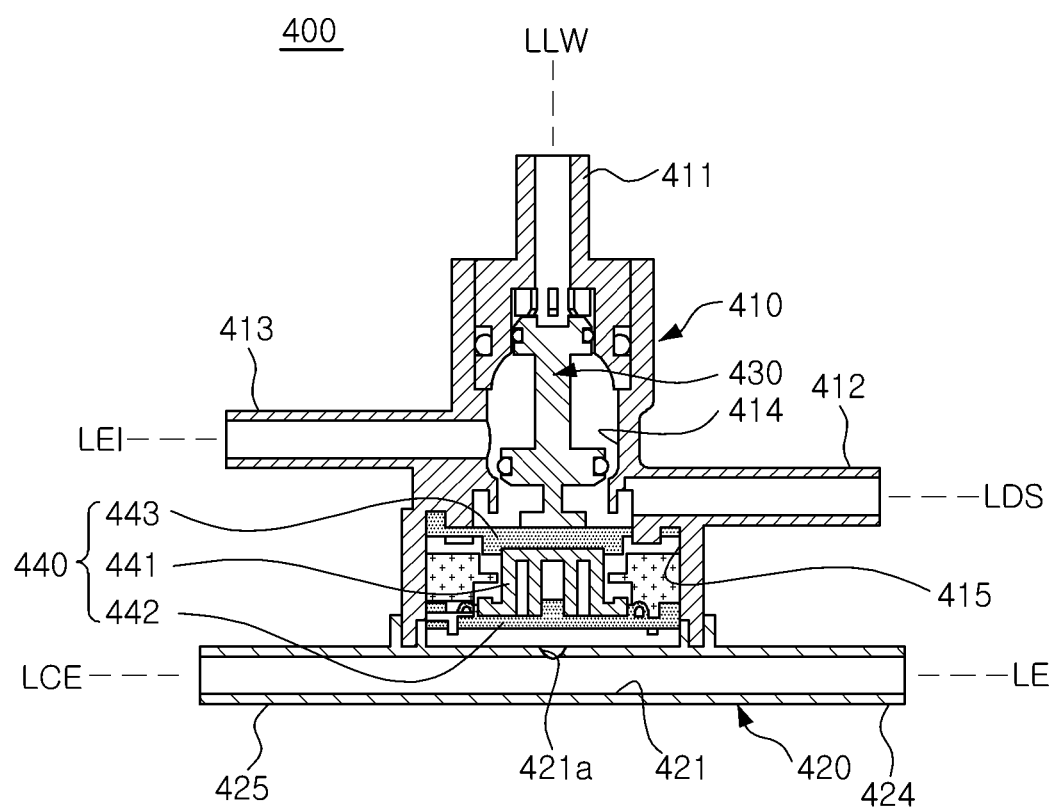

[Figure 17]
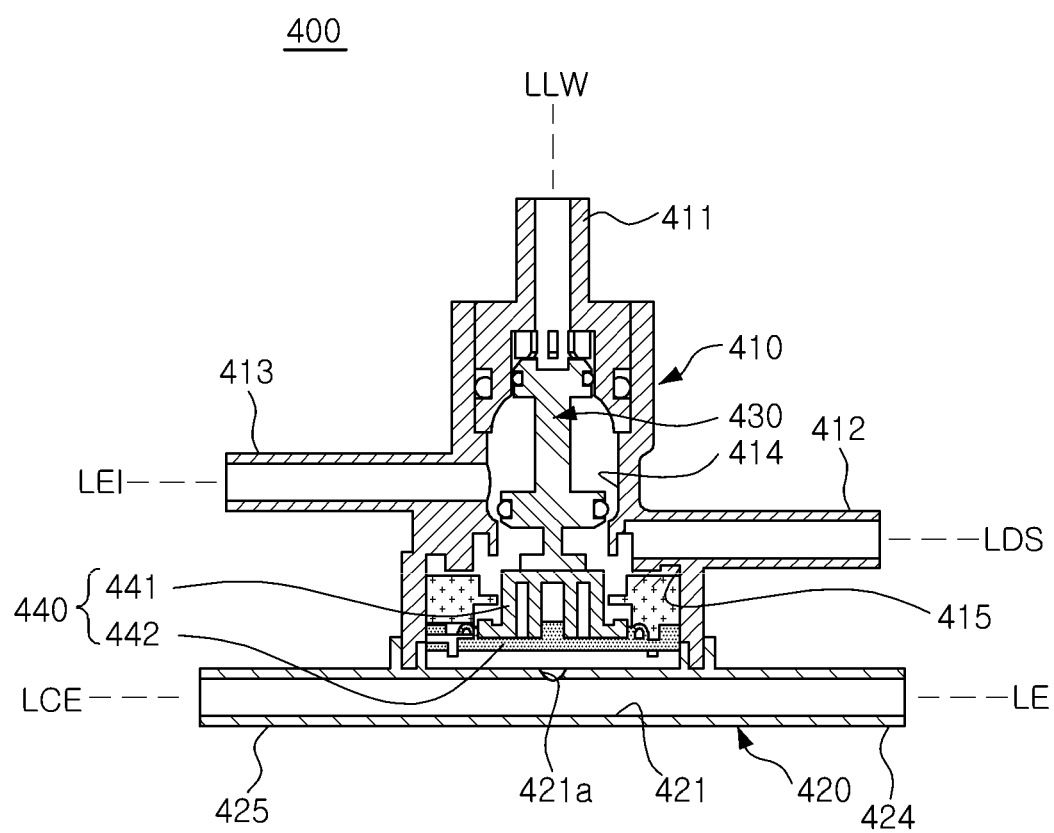

【Figure 18】
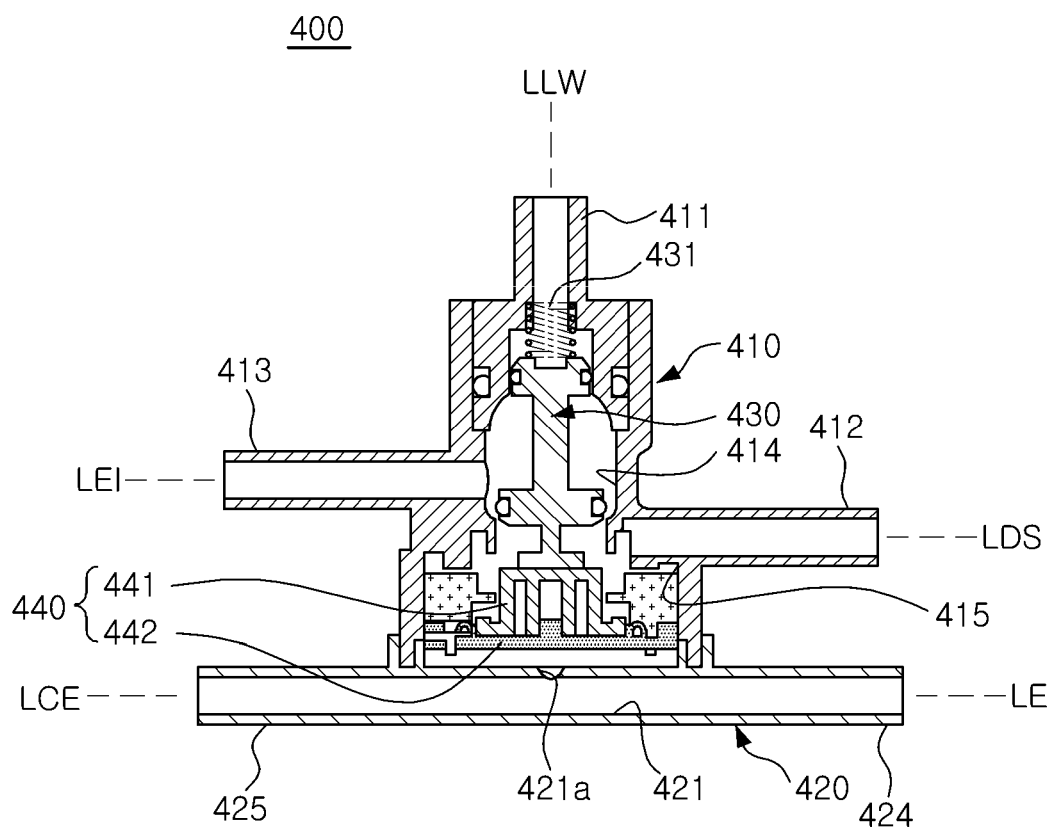

[Figure 19]
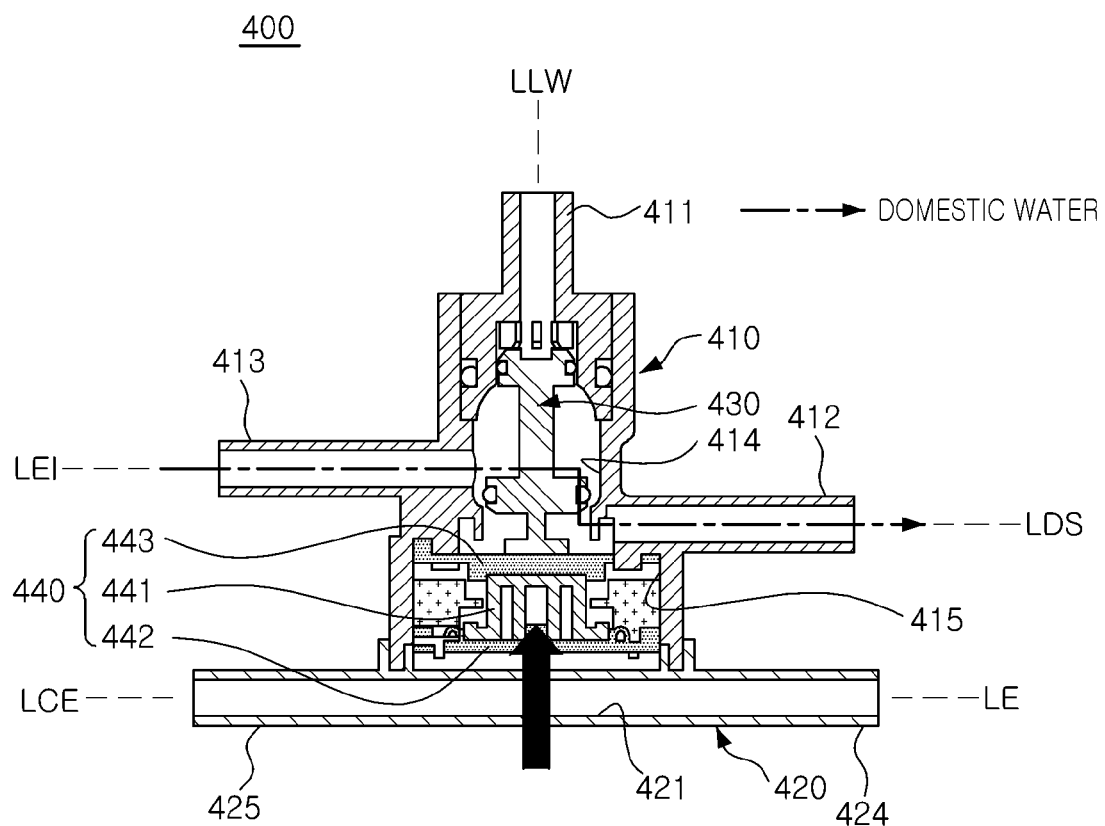

[Figure 20]
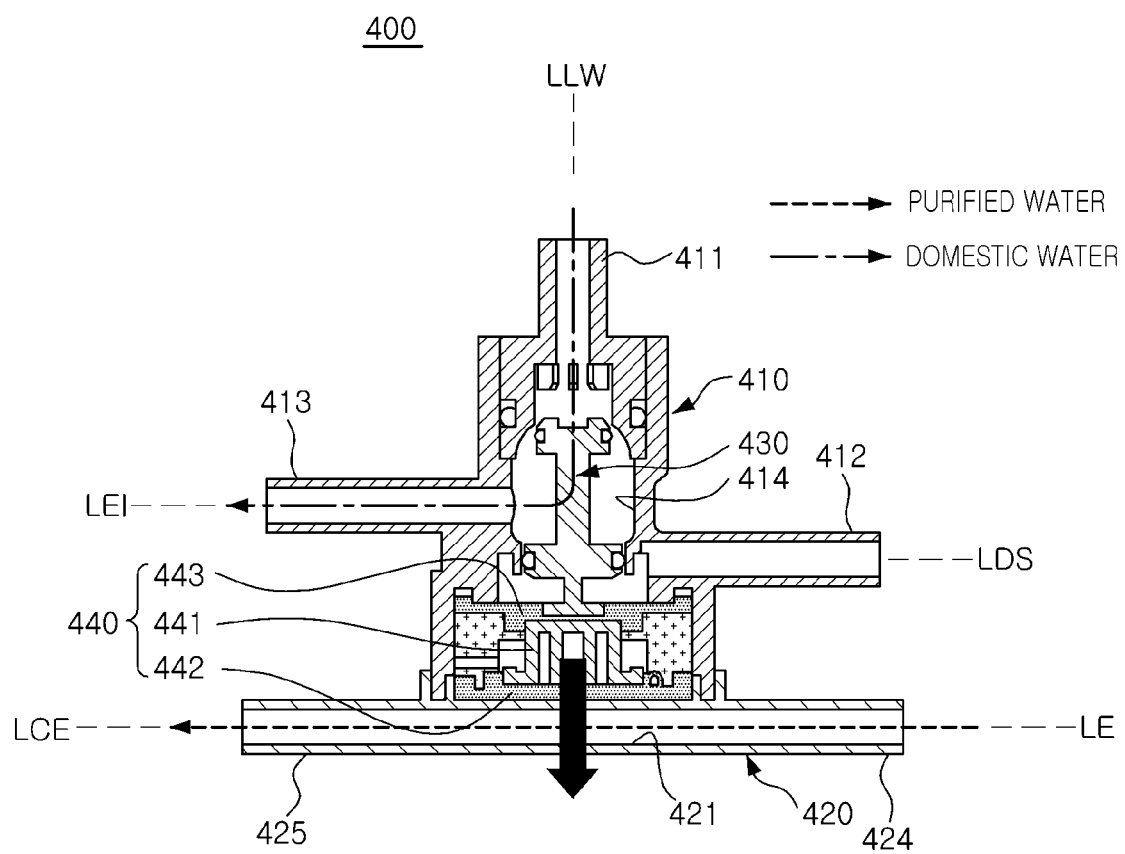

【Figure 21】
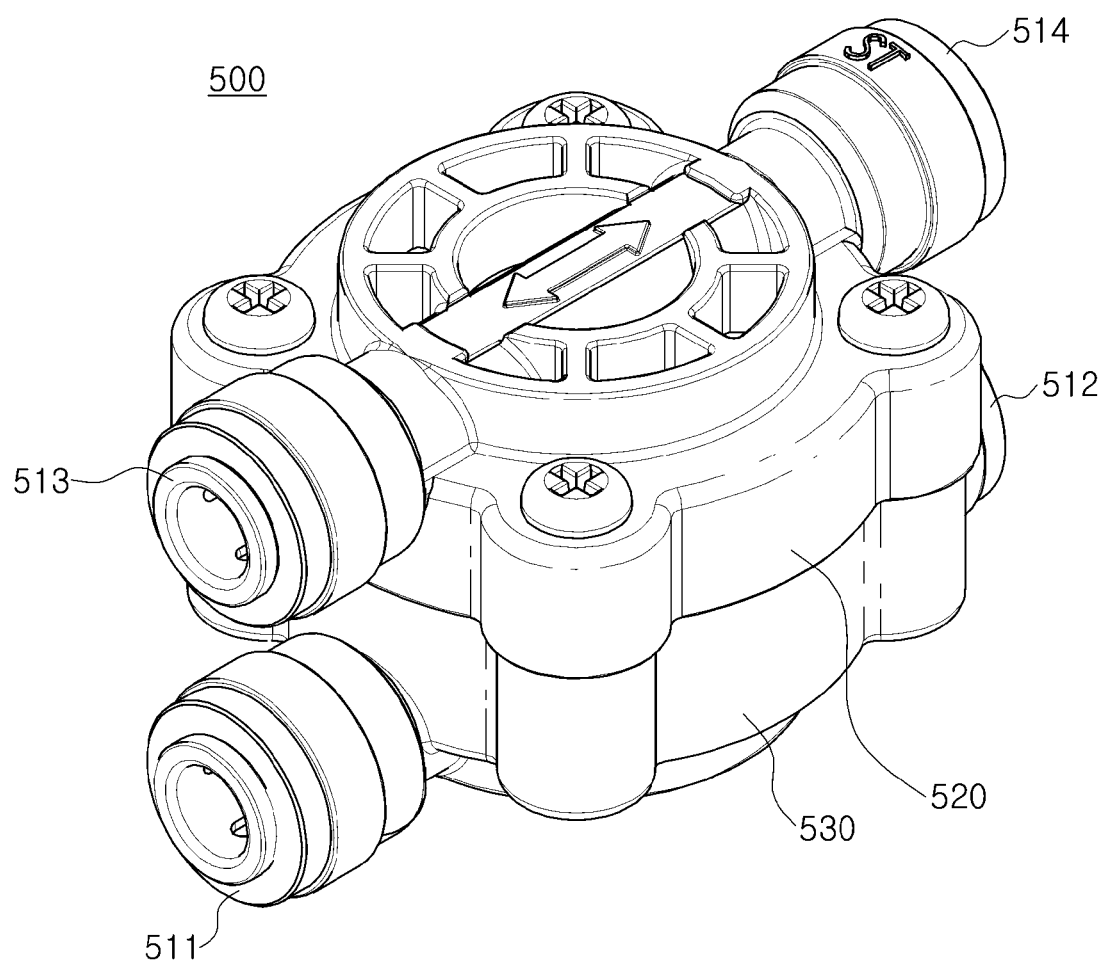

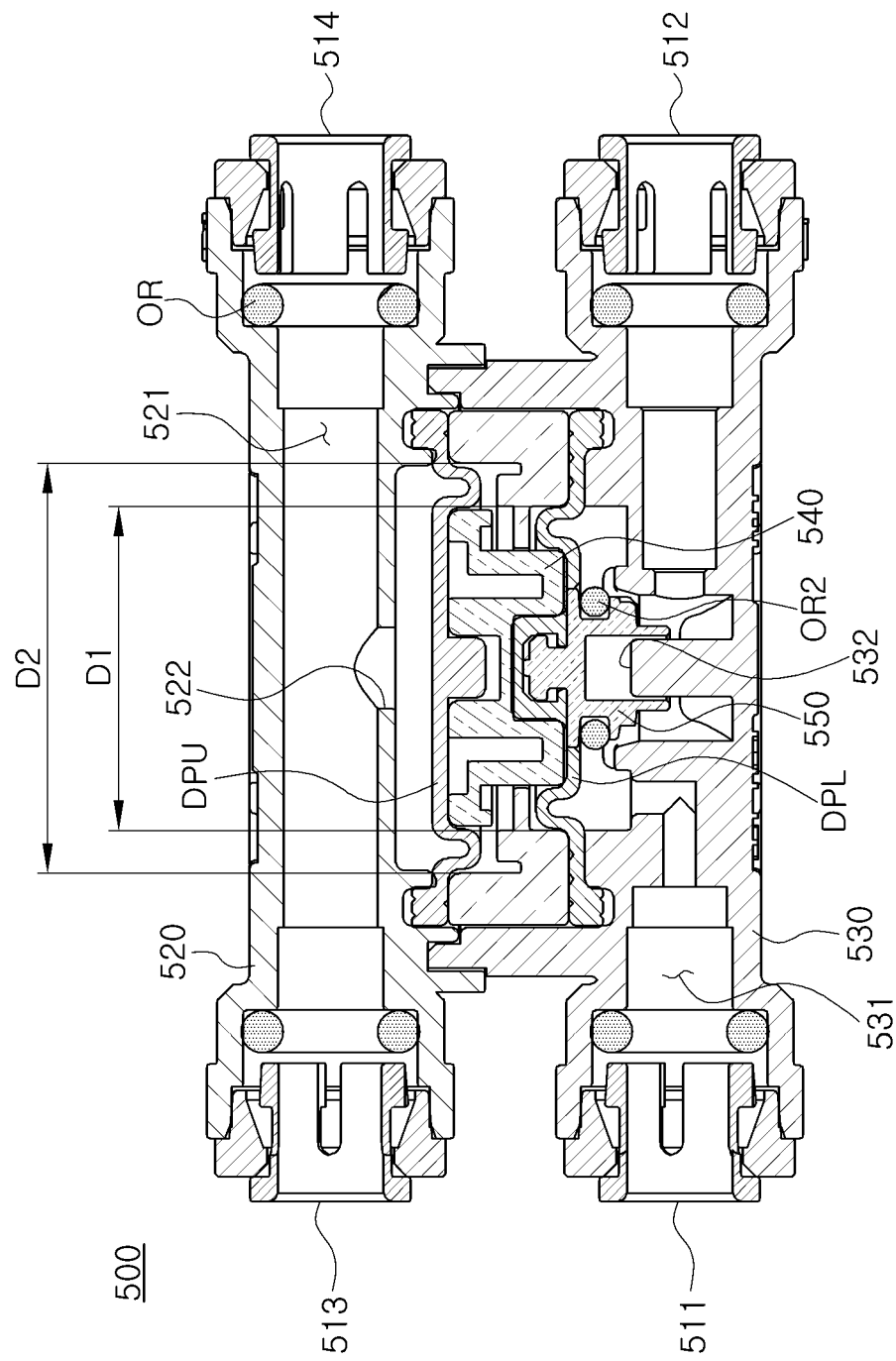
[Figure 22]

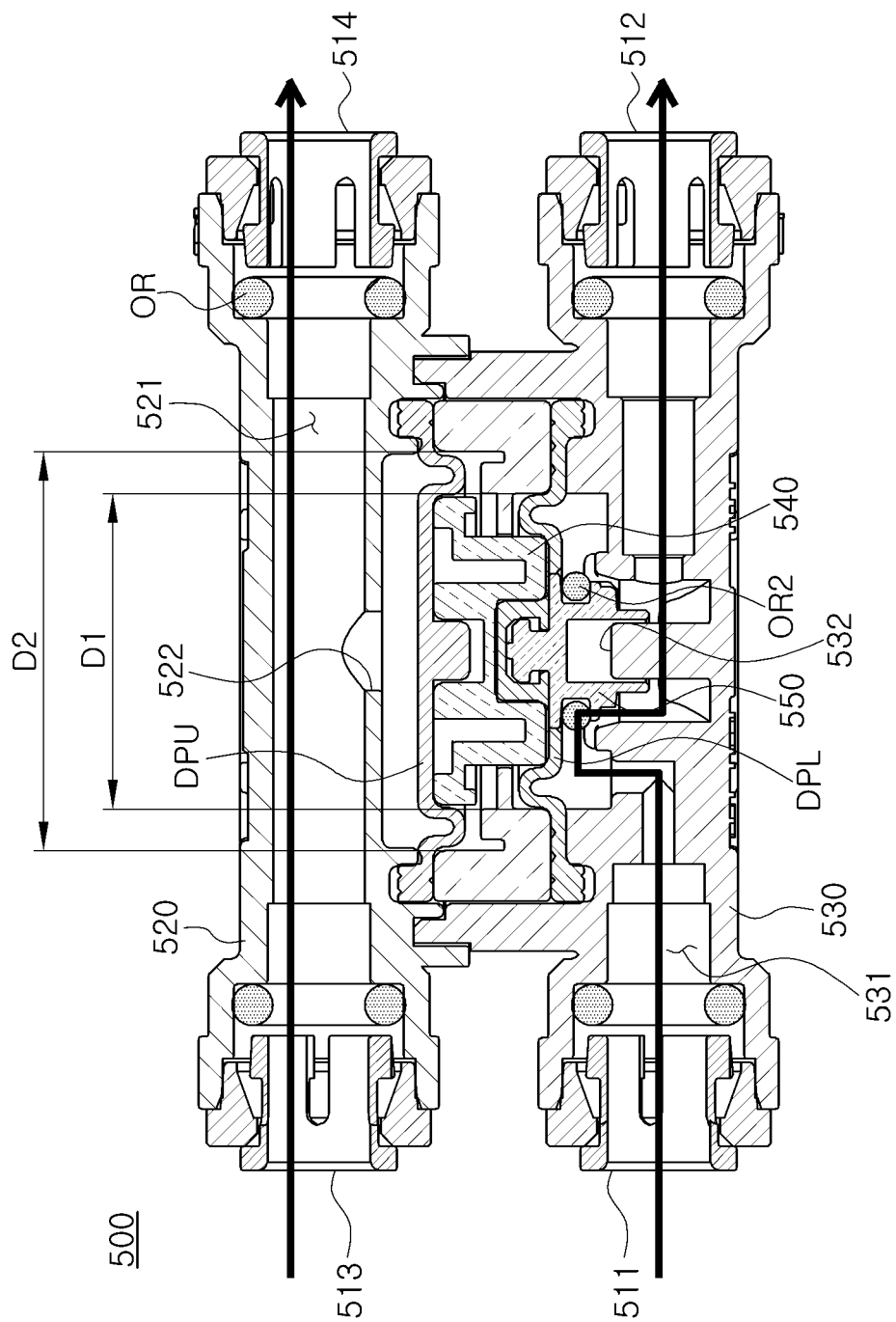
[Figure 23]

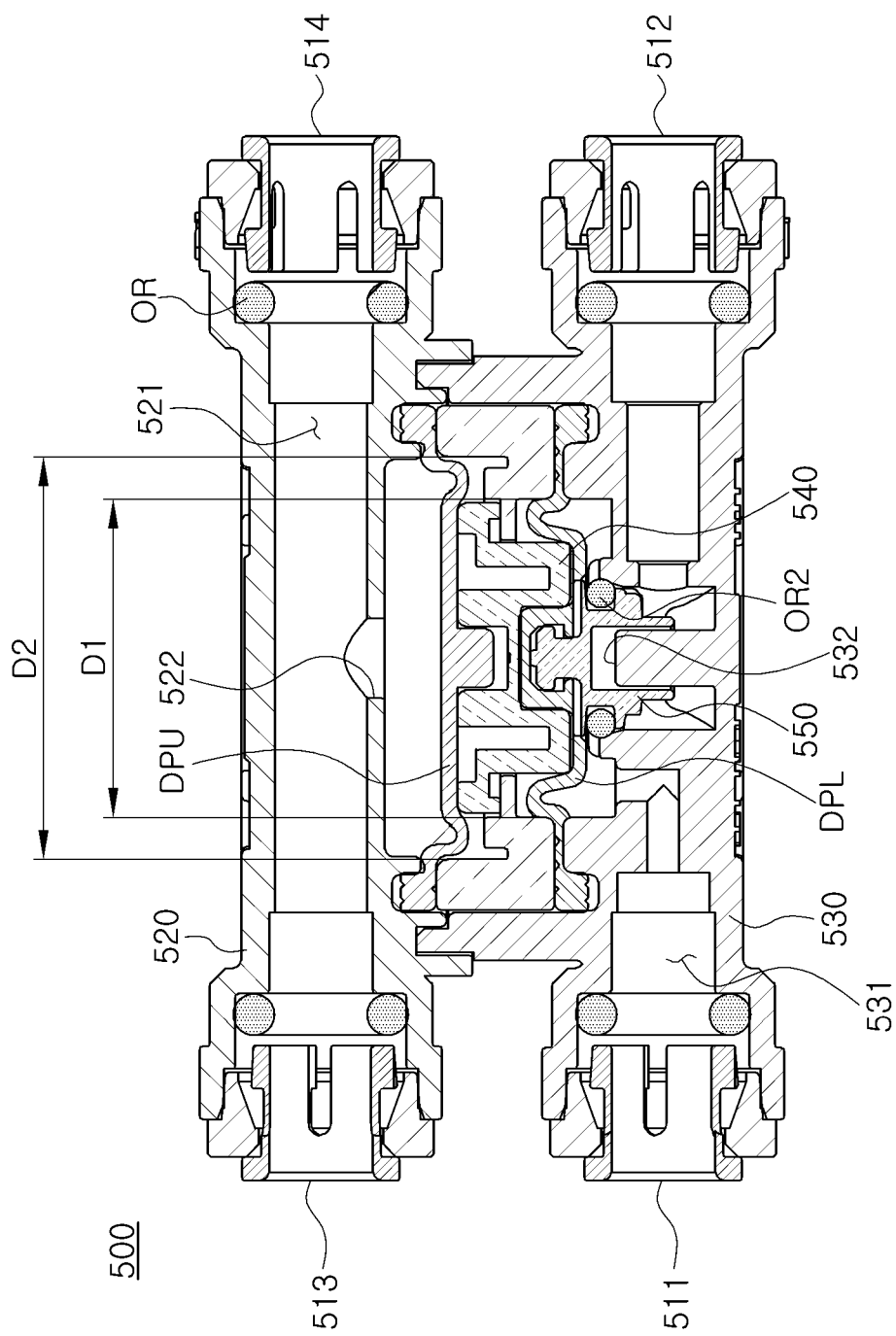
[Figure 24]

[Figure 25]
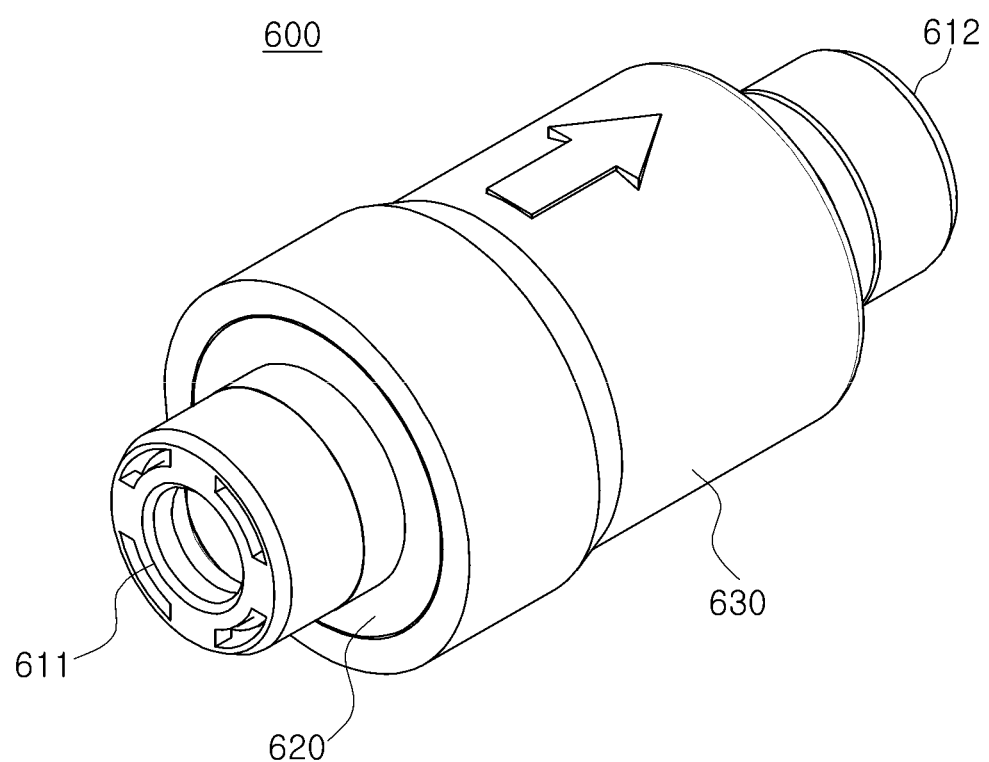

【Figure 26】
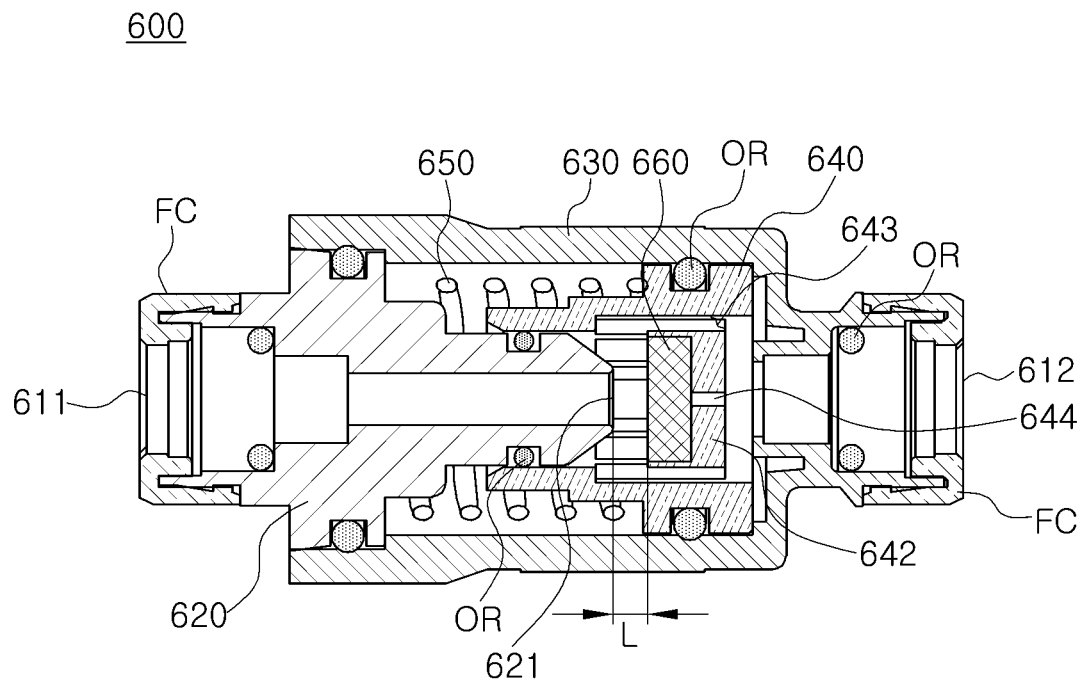
【Figure 27】
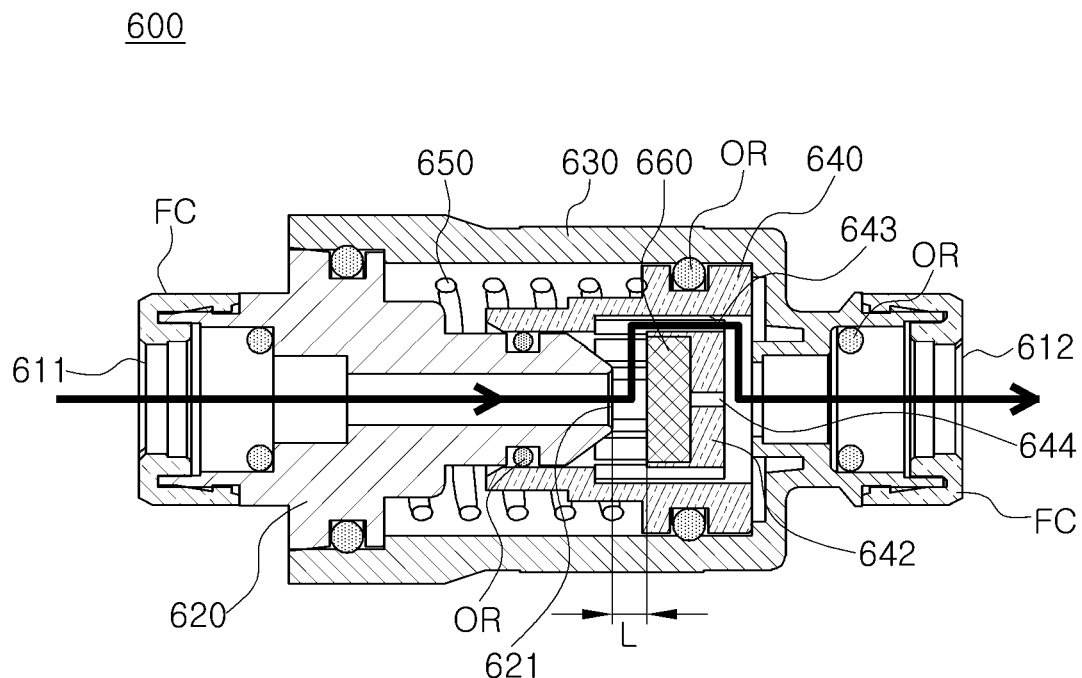

[Figure 28]
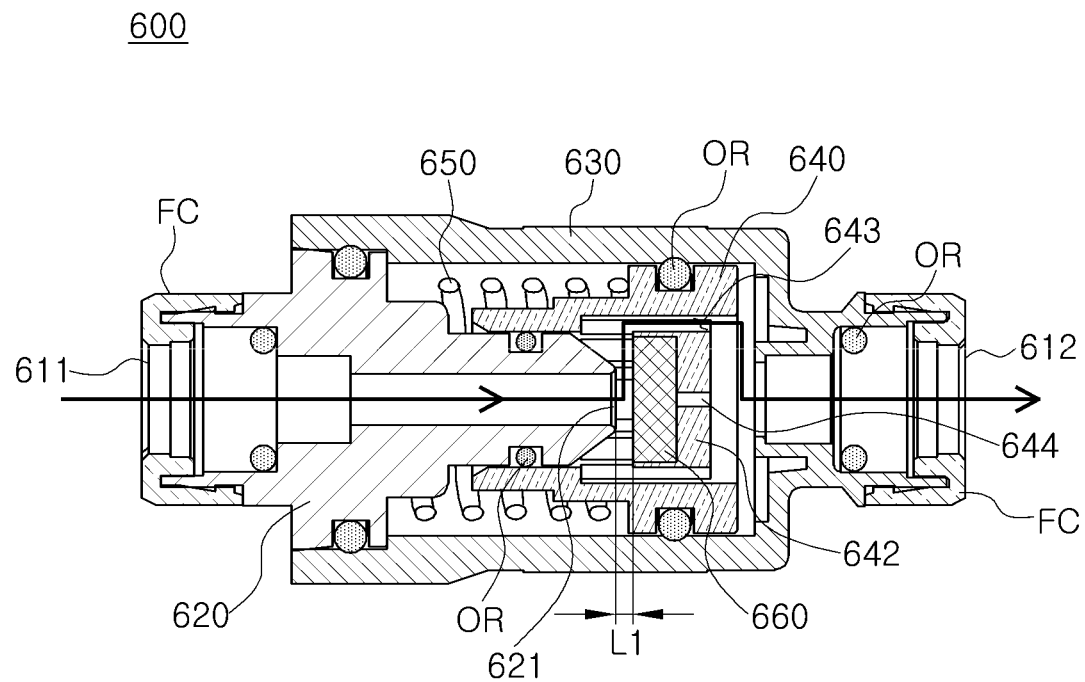
[Figure 29]
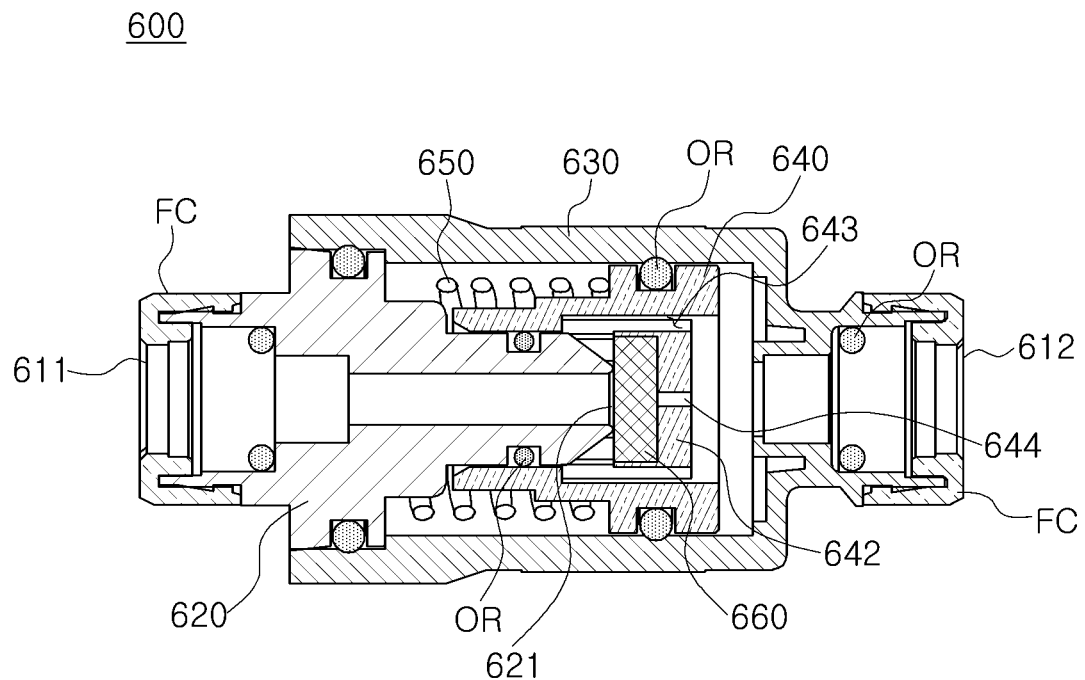

WATER TREATMENT APPARATUS

PRIORITY

This application is a National Phase Entry of PCT International Application No. PCT/KR2015/014383, which was filed on Dec. 29, 2015, and claims priority to Korean Patent Application Nos. 10-2014-0192911 and 10-2014-0192914, which were each filed on Dec. 30, 2014, the contents of each of which are incorporated herein by reference.

TECHNICAL FIELD

The present disclosure relates to a water treatment apparatus, and in more detail, to the water treatment apparatus extracting purified water by pressure of raw water.

BACKGROUND ART

Water treatment apparatuses are provided as devices providing users with drinking water by treating introduced water to be outwardly discharged.

Such water treatment apparatuses are provided as water purifiers, including one or more water purifying filters, which filter introduced water to be supplied to users. In addition to water purifiers described above, water treatment apparatuses also include carbonators injecting carbon dioxide ($CO_2$) into introduced water to provide users with the water, and water ionizers decomposing introduced water into alkaline water and acid water using electrolysis, to be supplied to users.

Such water treatment apparatuses may include a water tank into which purified water that has been filtered flows to be stored.

Since purified water is stored in such water tanks under an atmospheric pressure condition, an extraction position of purified water is limited.

For example, there is a problem in which purified water stored in a water tank may be discharged outwardly through an extraction portion only in a case in which an extraction portion, such as a cock, a faucet, or the like, connected to a water tank and outwardly discharging purified water stored in a water tank, is disposed in a position lower than the surface level of a water tank.

DISCLOSURE

Technical Problem

The present disclosure is provided to solve at least one of the problems in the related art described above and aims to provide a water treatment apparatus extracting purified water by pressure of raw water.

An aspect of the present disclosure may provide a water treatment apparatus in which a position of an extraction portion is not limited.

An aspect of the present disclosure may provide a water treatment apparatus in which a flow path is converted when water is purified and purified water is extracted by pressure of raw water.

An aspect of the present disclosure may provide a water treatment apparatus automatically blocking an introduction of raw water.

An aspect of the present disclosure may provide a water treatment apparatus allowing a reverse osmosis filter to be flushed.

An aspect of the present disclosure may provide a water treatment apparatus minimizing a chattering phenomenon of a flow path conversion valve.

An aspect of the present disclosure may provide a water treatment apparatus easily discharging water from a storage portion.

An aspect of the present disclosure may provide a water treatment apparatus confirming water leakage from a storage portion or a flow path or determining whether or not there is a defect in a component disposed on a flow path.

Technical Solution

According to an aspect of the present disclosure, a water treatment apparatus comprises a filtering portion filtering raw water; a storage portion storing purified water that has been filtered by passing through at least a portion of filters disposed in the filtering portion and including a first chamber and a second chamber, a volume of which is changed depending on a change in a volume of the first chamber; an extraction portion disposed to supply the purified water that has been filtered a user; and an air supply portion disposed on a flow path connected to the storage portion, in order to supply air to either the first chamber or the second chamber of the storage portion.

In this case, the air supply portion may be connected to a purified water line providing the storage portion with the purified water that has been filtered by passing through the at least a portion of filters disposed in the filtering portion to the storage portion.

According to an aspect of the present disclosure, a water treatment apparatus includes a purified water supply line supplying purified water supplied by the purified water line to the storage portion and includes an extraction line supplying purified water supplied by the purified water line to the extraction portion. The air supply portion is disposed in a purified water branch portion in which the purified water line is divided into a flow path connected to the extraction line and the purified water supply line.

The purified water line may include a first check valve disposed in a front portion of the purified water branch portion, in order to prevent purified water from flowing back from the purified water branch portion to the filtering portion. In addition, a second check valve may be disposed between the purified water branch portion and the extraction portion, in order to prevent purified water from flowing back toward the purified water branch portion.

An additional filter may be disposed between the second check valve and the extraction line to further filter purified water passing through the second check valve. In addition, the additional filter may be disposed in a purified water discharge line connecting the purified water branch portion to the extraction line. Alternatively, the additional filter may be disposed between the first check valve and the purified water branch portion, in order to further filter purified water that has passed through the first check valve.

In the meantime, according to an aspect of the present disclosure, a water treatment apparatus further includes an automatic shut-off valve blocking a flow of raw water into the filtering portion in a case in which pressure of the extraction line is higher than or equal to a set pressure. The extraction line may be connected to the automatic shut-off valve by a pressure transfer line.

The automatic shut-off valve may include a first flow path portion in which raw water or water that has passed through at least a portion of filters disposed in the filtering portion flows and may include a second flow path portion connected to the pressure transfer line divided in a flow path connecting the storage portion to the extraction portion.

In this case, the first flow path portion may be configured to be connected to a front portion of the reverse osmosis filter, and the second flow path portion may be configured in such a manner that one side thereof is connected to the pressure transfer line, and the other side is closed.

According to another aspect of the present disclosure, the automatic shut-off valve includes the first flow path portion connected to a drain line, through which domestic water that has not passed through the reverse osmosis filter is discharged and includes the second flow path portion in which the purified water that has been filtered by passing through the reverse osmosis filter flows.

In addition, the air supply portion may be provided as a port disposed on a flow path connected to the storage portion.

Furthermore, the air supply portion may have a valve structure in which the flow path is closed in a case in which air is not supplied, and is opened in a case in which air is supplied.

The air supply portion may be disposed on a flow path connected to the first chamber and may be configured in such a manner that a volume of the first chamber is increased by supplying air to the first chamber and a volume of the second chamber is reduced, and water accommodated in the second chamber is discharged by reducing a volume of the second chamber.

According to an aspect of the present disclosure, the water treatment apparatus further includes the flow path conversion valve by which the flow path is converted to allow purified water to flow into the storage portion or to allow purified water to be discharged from the storage portion.

The flow path conversion valve may include a plurality of ports, while the flow path may be converted by pressure of water supplied from the filtering portion.

In addition, in the flow path conversion valve, the flow path may be converted depending on pressure of the extraction line supplying purified water to the extraction portion. In a case in which the pressure of the extraction line is lower than the set pressure, the flow path allowing purified water to be moved from the storage portion to the extraction portion may be formed in the flow path conversion valve. In a case in which the pressure of the extraction line is higher than the set pressure, the flow path allowing purified water to be stored in the storage portion may be formed in the flow path conversion valve.

In addition, the purified water that has been filtered by passing through at least a portion of filters disposed in the filtering portion is stored in the first chamber. The flow path conversion valve may comprise a first body portion including a first port connected to the filtering portion, a second port connected to the drain line, and a third port connected to the second chamber, and may comprise a second body portion connected to the extraction line.

Furthermore, in the case of the flow path conversion valve, the flow path may be converted between the flow path supplying water from the filtering portion to the second chamber and the flow path discharging water from the second chamber through the drain line. In this case, the first port may be connected to a chamber water line in which domestic water that has not passed through the reverse osmosis filter flows.

In addition, the domestic water that has not passed through the reverse osmosis filter may be discharged outwardly through the drain line or may be supplied to the second chamber through the first port connected to the chamber water line. In this case, a flow path resistance means, limiting discharge of the domestic water that has not passed through the reverse osmosis filter, may be disposed in the drain line. When domestic water is supplied to the second chamber through the chamber water line, an amount of domestic water supplied to the second chamber through the chamber water line is greater than an amount of domestic water discharged through the drain line, thereby flushing the reverse osmosis filter.

In addition, the flow path conversion valve may further include a plunger disposed to be movable in the first body portion, and the plunger connects the second port to the third port or connects the first port to the third port.

In this case, the flow path conversion valve may further include a pressing portion disposed to be movable in the first body portion, and the pressing portion moves the plunger, depending on a change in pressure of water flowing in the extraction line. The pressing portion may include a pressing member disposed to be in contact with the plunger and movable and may include a first diaphragm disposed in the pressing member, in order to receive pressure of water flowing in the extraction line. In addition, an area in which the first diaphragm is in contact with water flowing in the extraction line may be formed to be greater than an area in which the plunger is in contact with water flowing into the first port. Furthermore, the pressing portion may further include a second diaphragm disposed in the pressing member to be in contact with the plunger.

In addition, the plunger may be elastically supported by an elastic member.

According to an aspect of the present disclosure, a water treatment apparatus includes a pressure reducing valve disposed between the third port and the second chamber and reducing fluctuation pressure formed when the flow path of the flow path conversion valve is converted.

The pressure reducing valve may maintain pressure of water flowing in the pressure reducing valve to be lower than or equal to the set pressure when water stored in the second chamber is discharged through the drain line. In addition, the pressure reducing valve may be configured to block the flow path between the second chamber and the third port when the second chamber is completely filled.

Furthermore, the storage portion may include a housing in which an internal space is formed to store purified water that has been filtered in the filtering portion and may include a partition member partitioning the internal space of the housing into the first chamber and the second chamber and changed depending on a change in volumes of the first chamber and the second chamber.

In this case, the partition member may include an entrance formed on a side thereof and have a balloon form.

In the meantime, the filtering portion may include the reverse osmosis filter. Purified water that has been filtered by the reverse osmosis filter may flow into the first chamber, while domestic water that has not passed through the reverse osmosis filter may flow into the second chamber. Furthermore, the purified water that has been filtered by the reverse osmosis filter may flow into the first chamber, while the water that has not passed through the reverse osmosis filter may flow into the second chamber. Purified water that has been filtered by passing through at least a portion of filters disposed in the filtering portion may flow into the first chamber, while water having a degree of filtration lower than that of the first chamber may flow into the second chamber. Purified water that has been filtered by passing through at least a portion of filters disposed in the filtering portion may flow into the first chamber, while raw water may flow into the second chamber.

Advantageous Effects

According to an aspect of the present disclosure, purified water may be extracted by pressure of raw water.

According to an aspect of the present disclosure, since extraction is performed by hydraulic pressure, a position of an extraction portion is not limited.

According to an aspect of the present disclosure, since a flow path is automatically converted during a process of purifying water and extracting purified water by pressure of raw water, power supply is not required to convert the flow path.

According to an aspect of the present disclosure, an introduction of raw water may be automatically blocked depending on pressure of the flow path.

According to an aspect of the present disclosure, a reverse osmosis filter may be flushed by discharging a large amount of water that has not passed through the reverse osmosis filter, thereby increasing a lifespan of the reverse osmosis filter.

According to an aspect of the present disclosure, a chattering phenomenon of a flow path conversion valve may be minimized by installing a pressure reducing valve.

According to an aspect of the present disclosure, water in a storage portion may be easily discharged through an air supply portion.

According to an aspect of the present disclosure, water leakage of a storage portion or a flow path may be confirmed or it can be determined whether or not there is a defect in a component disposed in the flow path by an air supply portion.

DESCRIPTION OF DRAWINGS

FIG. 1 is a piping diagram of a water treatment apparatus according to an example.

FIG. 2 is a piping diagram illustrating a flow path of the water treatment apparatus illustrated in FIG. 1, when purified water is stored.

FIG. 3 is a piping diagram illustrating a flow path of the water treatment apparatus illustrated in FIG. 1, when purified water is extracted.

FIG. 4 is a piping diagram of a modified example of the water treatment apparatus illustrated in FIG. 1.

FIG. 5 is a piping diagram of a water treatment apparatus according to an example.

FIG. 6 is a piping diagram of a modified example of the water treatment apparatus illustrated in FIG. 5.

FIG. 7 is a piping diagram of a water treatment apparatus according to another example.

FIG. 8 is a piping diagram of a modified example of the water treatment apparatus illustrated in FIG. 7.

FIG. 9 is a piping diagram of a water treatment apparatus according to another example.

FIG. 10 is a piping diagram illustrating a flow path of the water treatment apparatus illustrated in FIG. 9 when purified water is stored.

FIG. 11 is a piping diagram illustrating a flow path of the water treatment apparatus illustrated in FIG. 9 when purified water is extracted.

FIG. 12 is a piping diagram of a modified example of the water treatment apparatus illustrated in FIG. 9.

FIG. 13 is a piping diagram of a water treatment apparatus according to another example.

FIG. 14 is a piping diagram illustrating a flow path of the water treatment apparatus illustrated in FIG. 13 when purified water is stored.

FIG. 15 is a piping diagram illustrating a flow path of the water treatment apparatus illustrated in FIG. 13 when purified water is extracted.

FIG. 16 is a cross-sectional view of an example of a flow path conversion valve disposed in a water treatment apparatus according to an example.

FIG. 17 is a cross-sectional view of a modified example of the flow path conversion valve illustrated in FIG. 16.

FIG. 18 is a cross-sectional view of a different modified example of the flow path conversion valve illustrated in FIG. 16.

FIG. 19 is a cross-sectional view illustrating a state of a flow path of the flow path conversion valve illustrated in FIG. 16 when purified water is stored.

FIG. 20 is a cross-sectional view illustrating the state of the flow path of the flow path conversion valve illustrated in FIG. 16 when purified water is extracted.

FIG. 21 is a perspective view of an example of an automatic shut-off valve disposed in a water treatment apparatus according to an example.

FIG. 22 is a cross-sectional view of the automatic shut-off valve illustrated in FIG. 21.

FIG. 23 is a cross-sectional view illustrating a state in which water flows in a first flow path portion of the automatic shut-off valve illustrated in FIG. 22.

FIG. 24 is a cross-sectional view illustrating a state in which a water flow is blocked in the first flow path portion of the automatic shut-off valve illustrated in FIG. 22.

FIG. 25 is a perspective view of an example of a pressure reducing valve disposed in a water treatment apparatus according to an example.

FIG. 26 is a cross-sectional view of the pressure reducing valve illustrated in FIG. 25.

FIG. 27 is a cross-sectional view illustrating a state in which water flows in the pressure reducing valve illustrated in FIG. 26.

FIG. 28 is a cross-sectional view illustrating a state in which a water flow is reduced to be lower than the case of FIG. 27.

FIG. 29 is a cross-sectional view illustrating a state in which a water flow of the pressure reducing valve, illustrated in FIG. 26, is blocked.

BEST MODE FOR INVENTION

Hereinafter, examples of the present disclosure will be described in detail with reference to the accompanying drawings. The disclosure may, however, be exemplified in many different forms and should not be construed as being limited to the specific embodiments set forth herein, and those skilled in the art and understanding the present disclosure can easily accomplish retrogressive inventions or other embodiments included in the scope of the present disclosure by the addition, modification, and removal of components within the same scope, but those are construed as being included in the scope of the present disclosure. Like reference numerals will be used to designate like components having similar functions throughout the drawings within the scope of the present disclosure.

As used herein, the singular forms "a," "an," and "the" are intended to include the plural forms as well, unless the context clearly indicates otherwise. In addition, the same reference character, described in an example described above, may be construed as referring to the same member or the components corresponding thereto.

Hereinafter, an example will be described with reference to the attached drawings.

As illustrated in FIGS. 1 to 15, a water treatment apparatus 100 according to an example may be configured to include a filtering portion 200, a storage portion 300, and an extraction portion 700, and may be configured to selectively include at least one among a flow path conversion valve 400, a pressure reducing valve 600, an automatic shut-off valve 500 and an air supply portion AP.

EXAMPLES OF FIGS. 1 TO 4

First, with reference to FIGS. 1 to 4, a water treatment apparatus 100 according to an example will be described.

FIG. 1 is a piping diagram of a water treatment apparatus according to an example; FIG. 2 is a piping diagram illustrating a flow path of the water treatment apparatus illustrated in FIG. 1 when purified water is stored; FIG. 3 is a piping diagram illustrating the flow path of the water treatment apparatus illustrated in FIG. 1 when purified water is extracted; and FIG. 4 is a piping diagram of a modified example of the water treatment apparatus illustrated in FIG. 1.

As illustrated in FIGS. 1 to 4, the water treatment apparatus 100 according to an example may be configured to include a filtering portion 200 filtering raw water, a storage portion 300 storing purified water that has been filtered by passing through at least a portion of filters disposed in the filtering portion 200, and an extraction portion 700 disposed to supply a user the purified water that has been filtered, and may be configured to include a flow path conversion valve 400 in which a flow path is converted, in order to allow purified water to flow into the storage portion 300 or to flow out of the storage portion 300.

In addition, as illustrated in FIGS. 1 to 4, the water treatment apparatus 100 according to an example may be configured to include the filtering portion 200 filtering raw water, the storage portion 300 storing purified water that has been filtered by passing through at least a portion of filters disposed in the filtering portion 200, the extraction portion 700 disposed to provide a user with the purified water that has been filtered, the flow path conversion valve 400 converting the flow path depending on flowing of purified water in and out of the storage portion 300, and the pressure reducing valve 600, reducing fluctuation pressure formed when the flow path conversion valve 400 converts the flow path.

In addition, as illustrated in FIGS. 1 to 4, the water treatment apparatus 100 according to an example may be configured to include the filtering portion 200 filtering raw water, the storage portion 300 storing purified water that has been filtered by the filtering portion 200, the extraction portion 700 extracting purified water stored in the storage portion 300, the automatic shut-off valve 500 blocking an inflow of raw water in a case in which pressure in an interior of the storage portion 300 or pressure of a specific flow path disposed in an interior of the water treatment apparatus 100 is higher than or equal to a set pressure.

As illustrated in FIG. 4, the water treatment apparatus 100 according to an example may be configured to include the filtering portion 200 filtering raw water, the storage portion 300 storing purified water that has been filtered by passing through at least a portion of filters disposed in the filtering portion 200, the extraction portion 700 disposed to provide a user with the purified water that has been filtered, and an air supply portion AP disposed on a flow path connected to the storage portion 300, in order to supply air to the storage portion 300.

Hereinafter, configurations of the filtering portion 200, the storage portion 300, the extraction portion 700, the flow path conversion valve 400, the pressure reducing valve 600, the automatic shut-off valve 500, and the air supply portion AP, disposed in the water treatment apparatus 100 according to an example, will be described.

[Filtering Portion 200]

The filtering portion 200 may include one or more filters to filter raw water obtained through a raw water line LRW.

For example, as illustrated in FIGS. 1 to 4, the filtering portion 200 may be configured to include a first filter 210, a second filter 220, a third filter 250, and an additional filter 260.

In this case, the first filter 210 may be formed using a sediment filter, the second filter 220 may be formed using a pre-carbon filter, the third filter 250 may be formed using a reverse osmosis filter, and the additional filter 260 may be formed using a post-carbon filter.

The sediment filter performs a function of receiving raw water from the raw water line LRW and adsorbing and removing suspended solids including a relatively large particle included in raw water and a solid material, such as sand, or the like. In addition, the pre-carbon filter performs a function of receiving water that has passed through the sediment filter and removing a chemical substance harmful to a human body, such as a volatile organic compound, a carcinogen, a synthetic detergent, an insecticide, or the like, included in water, as well as a residual chlorine component (e.g., hypochlorous acid (HOCl) or chlorine dioxide (ClO)), using a method of adsorbing activated carbon.

In addition, the reverse osmosis filter performs a function of receiving water that has been filtered by the pre-carbon filter and removing a minute organic/inorganic material, such as a heavy metal, other metal ions, and a bacterium included in water, through a membrane including a micropore. The reverse osmosis filter is connected to a drain line LD to discharge domestic water generated when raw water is filtered, that is, waste water. (Domestic water is also commonly referred to as "concentrated water" in the art, due to a relatively high concentration of total dissolved solids (TDS).) In the drain line LD, a drain valve VR is disposed as a flow path resistance means to adjust a discharged amount of domestic water. The drain valve VR may form a flow path narrower than a purified water line LPW through which purified water that has been filtered is discharged, in order to limit discharge of domestic water.

Furthermore, the post-carbon filter is provided as a carbon filter using the method of adsorbing activated carbon using coal, lumber, and a coconut as a material. The post-carbon filter performs a function of adsorbing and removing a foul taste, smell, pigment, and the like, of water that has been filtered by passing through the reverse osmosis filter.

However, a type of, a number of, and an order of a filter disposed in the filtering portion 200 may be changed depending on a filtering method of a water treatment apparatus or desired filtering performance thereof. The present disclosure is not limited to a structure of the filtering portion 200 illustrated in FIGS. 1 to 15. For example, as the third filter 250, a hollow fiber filter may be disposed, rather than the reverse osmosis filter. The hollow fiber filter is provided as a porous filter including a pore having a size in a range of tens to hundreds nanometers. The hollow fiber filter removes a pollutant in water through numerous micropores distributed in a surface of a film.

However, in the case of an example illustrated in FIGS. 1 to 4, as subsequently illustrated, since domestic water is supplied to a second chamber 320 of the storage portion 300, the reverse osmosis filter may be used as the third filter 250. However, as in the case of an example illustrated in FIGS. 9 to 12, in a case in which raw water or purified water that has been filtered by passing through at least a portion of filters, is supplied to the second chamber 320 of the storage portion 300, the third filter 250 is not limited to the reverse osmosis filter, and the hollow fiber filter may be used. Hereinafter, the third filter 250 may be referred to as a reverse osmosis filter 250.

In addition, a plurality of filters included in the filtering portion 200 are not specifically limited to an independent cartridge form, and may be configured as a composite filter having a function the same as those of two or more filters. For example, as in the case of an example illustrated in FIGS. 5 to 15, the sediment filter and the pre-carbon filter may be configured as a single pretreatment composite filter 210'.

With reference to FIGS. 1 to 4, raw water introduced through the raw water line LRW is filtered by the first filter 210 and flows into the second filter 220 through a raw water pressure reducing valve REG, disposed in a connection line LC. The raw water pressure reducing valve REG reduces pressure of raw water to supply the raw water to the filtering portion 200, in a case in which a level of supply pressure of raw water from the raw water line LRW is higher than a predetermined level of pressure. The raw water pressure reducing valve REG may be interposed between the first filter 210 and the second filter 220, as illustrated in FIGS. 1 to 4, but a position thereof is not limited thereto. The raw water pressure reducing valve REG may also be disposed in a front portion of the first filter 210.

In the meantime, purified water that has been filtered by the second filter 220 is supplied to the reverse osmosis filter 250 through the connection line LC. The reverse osmosis filter 250 is connected to the purified water line LPW, through which purified water that has been filtered is discharged, and the drain line DL, to discharge domestic water generated when raw water is filtered. In addition, the reverse osmosis filter 250 may be connected to a chamber water line LLW to supply domestic water to the second chamber 320 of the storage portion 300. The chamber water line LLW may supply domestic water to the second chamber 320 from the reverse osmosis filter 250, in a case in which purified water stored in a first chamber 310 of the storage portion 300 is extracted by the extraction portion 700. Furthermore, in the drain line LD, the drain valve VR, to adjust a discharged amount of domestic water, is disposed. The drain valve VR forms a flow path narrower than the purified water line LPW through which purified water that has been filtered is discharged, in order to limit discharge of domestic water.

In the meantime, purified water that has been filtered in the reverse osmosis filter 250 may be supplied to the storage portion 300 through the purified water line LPW and a purified water supply line LPW1, or may be supplied to the extraction portion 700 through the purified water line LPW, purified water discharge lines LPW2 and LPW3, an extraction line LE, or the like, to be supplied to a user. To this end, a purified water branch portion TC2 may be formed in a position in which the purified water line LPW is divided into a flow path (purified water discharge lines LPW2 and LPW3) connected to the extraction line LE and the purified water supply line LPW1.

In other words, purified water that has been filtered in the reverse osmosis filter 250 is supplied to the storage portion 300 or is extracted by the extraction portion 700, depending on a conversion of a flow path of the flow path conversion valve 400, to be subsequently described. To this end, the purified water line LPW is divided into the purified water supply line LPW1, and a purified water discharge line LPW2, in the purified water branch portion TC2.

In addition, a first check valve CV1 may be disposed on a flow path between the reverse osmosis filter 250 and the storage portion 300. In other words, the first check valve CV1 may be disposed in the purified water line LPW in a front portion of the purified water branch portion TC2, thereby preventing purified water from flowing back toward the reverse osmosis filter 250 of the filtering portion 200 from the purified water branch portion TC2.

In addition, a second check valve CV2 may be disposed on a flow path between the storage portion 300 and the extraction portion 700. In other words, the second check valve CV2 is disposed in the purified water discharge line LPW2, between the purified water branch portion TC2 and the extraction portion 700, thereby preventing purified water from flowing back toward the purified water branch portion TC2.

Through a configuration of the second check valve CV2, after an extraction of purified water by the extraction portion 700 is finished, pressure of the extraction line LE may be uniformly maintained.

In addition, the additional filter 260, to further filter purified water that has been filtered by the reverse osmosis filter 250, may be disposed in the purified water discharge lines LPW2 and LPW3 connecting the purified water branch portion TC2 to the extraction line LE. As described above, the additional filter 260 may be formed using the post-carbon filter, but is not limited thereto.

The additional filter 260 is configured to be disposed between the second check valve CV2 and the extraction line LE to further filter purified water passing through the second check valve CV2 before being discharged through the extraction portion 700.

In the meantime, the automatic shut-off valve 500, blocking an inflow of raw water, may be disposed in the connection line LC. The automatic shut-off valve 500 will be subsequently described.

[Storage Portion 300]

As illustrated in FIGS. 1 to 4, the storage portion 300 may include a housing 330 having an internal space formed therein to store purified water that has been filtered by at least a portion of filters disposed in the filtering portion 200 and may include a partition member 340 partitioning the internal space of the housing 330 into the first chamber 310 and the second chamber 320.

In this case, the partition member 340 may be formed to be changed depending on a change in volumes of the first chamber 310 and the second chamber 320. Thus, a volume of the first chamber 310 is changed depending on a change in a volume of the second chamber 320, while the volume of the second chamber 320 is changed depending on a change in the volume of the first chamber 310.

The partition member 340 may be formed to include an entrance formed on a side thereof and have a balloon form. The housing 330 may be formed to have a predetermined fixed volume, in order to accommodate the partition member 340 therein.

As such, an internal space of the partition member 340 forms the first chamber 310, while a space between the partition member 340 and the housing 330 forms the second chamber 320.

In this case, the partition member 340 may be formed using polyolefin elastomer. Polyolefin elastomer has excellent elasticity and a relatively high degree of fatigue fracture resistance compared with polyethylene, and the like. Thus, even in the case in which the partition member 340 is repeatedly folded and unfolded by water flowing in and out of the partition member 340, damage thereto may be minimized, and durability thereof may be improved. However, a material forming the partition member 340 is not limited thereto, and various materials harmless to a human body, such as polyethylene, may be applied.

The first chamber 310 is connected to the purified water supply line LPW1 so that purified water that has passed through at least a portion of filters disposed in the filtering portion 200 may be stored in the first chamber 310. As purified water is supplied to an interior of the first chamber 310, water accommodated in the second chamber 320 is outwardly discharged.

In this case, the second chamber 320 is connected to an entrance line LEI. As purified water is supplied to the first chamber 310, the water accommodated in the second chamber 320 is discharged outwardly through the entrance line LEI, a drain connection line LDS, and the drain line LD. In this case, the drain connection line LDS and the drain line LD may be connected by a drain connection portion TC1. In addition, since the drain connection portion TC1 is disposed in a rear portion, compared to the drain valve VR, the water accommodated in the second chamber 320 may be easily discharged through the drain connection line LDS.

Furthermore, as water is supplied to the second chamber 320, purified water stored in the first chamber 310 is discharged through the extraction portion 700. In detail, purified water accommodated in the first chamber 310 is discharged through the extraction portion 700 after passing through the purified water supply line LPW1, the purified water discharge lines LPW2 and LPW3, the extraction line LE, and an extraction connection line LCE.

In addition, domestic water not filtered in the reverse osmosis filter 250 may be supplied to the second chamber 320. In other words, as illustrated in FIG. 3, the domestic water not filtered in the reverse osmosis filter 250 may be supplied to the second chamber 320 through the chamber water line LLW, the flow path conversion valve 400, and the entrance line LEI.

In the meantime, the flow path conversion valve 400, converting a flow path to allow purified water to flow into the first chamber 310 of the storage portion 300 or to flow out of the first chamber 310 of the storage portion 300, may be disposed. A description thereof will be subsequently provided.

As such, purified water that has been filtered by the reverse osmosis filter 250 may flow into the first chamber 310, while the domestic water that has not passed through the reverse osmosis filter 250 may flow into the second chamber 320. In other words, purified water that has been filtered by passing through at least a portion of filters disposed in the filtering portion 200 flows into the first chamber 310, while water (domestic water), having a degree of filtration lower than that of raw water supplied to the first chamber 310, flows into the second chamber 320.

[Extraction Portion 700]

Purified water that has been filtered by passing through the filtering portion 200 and/or purified water stored in the storage portion 300 is discharged through the extraction portion 700. The extraction portion 700 may be formed using a cock, a faucet, or the like, and may be configured to include a mechanical or electronic extraction valve (not illustrated). Thus, when a user opens the extraction valve, the extraction of purified water is performed, and when the user closes the extraction valve, the extraction of purified water is finished.

[Flow Path Conversion Valve 400]

Subsequently, with reference to FIGS. 1 to 4 and FIGS. 16 to 20, the flow path conversion valve 400 will be described.

The flow path conversion valve 400 converts a flow path to allow purified water to flow into the storage portion 300 or to flow out of the storage portion 300.

The flow path conversion valve 400 includes a plurality of ports and converts the flow path by pressure of water supplied by the filtering portion 200. In other words, the flow path conversion valve 400 is configured to convert the flow path not by separate power, but by pressure of raw water supplied by the raw water supply line LRW.

In addition, the flow path conversion valve 400 converts the flow path depending on pressure of the extraction line LE in which purified water moves to the extraction portion 700. In detail, the flow path conversion valve 400 is configured to convert the flow path in such a manner that, in a case in which the pressure of the extraction line LE is lower than a set pressure (e.g., a value selected from a range of 20% to 40% of hydraulic pressure), a flow path allowing purified water to be moved from the storage portion 300 to the extraction portion 700 is formed, and, in a case in which the pressure of the extraction line LE is higher than the set pressure, a flow path allowing purified water to be stored in the storage portion 300 is formed.

In other words, the flow path conversion valve 400 forms a flow path allowing water accommodated in the second chamber 320 of the storage portion 300 to be discharged in a case in which purified water is supplied to the first chamber 310 of the storage portion 300, as illustrated in FIG. 2, and forms a flow path allowing domestic water to flow into the second chamber 320 in a case in which purified water accommodated in the first chamber 310 of the storage portion 300 is extracted by the extraction portion 700, as illustrated in FIG. 3.

The flow path conversion valve 400 may include a first port 411 connected to the filtering portion 200, a second port 412 connected to the drain line LD, and a third port 413 connected to the second chamber 320, while a fourth port 424 and a fifth port 425 may be disposed to be connected to the extraction line LE.

In detail, the first port 411 is connected to the chamber water line LLW, in which domestic water that has not passed through the reverse osmosis filter 250 flows; the second port 412 is connected to the drain line LD through the drain connection line LDS; the third port 413 is connected to the second chamber 320 through the entrance line LEI; the fourth port 424 is connected to the extraction line LE; and the fifth port 425 is connected to the extraction connection line LCE.

In this case, the flow path conversion valve 400 is configured to convert a flow path between a flow path allowing the third port 413, connected to the entrance line LEI, to be in communication with the second port 412, connected to a drain connection line LDS, in order to discharge water (domestic water) from the second chamber 320 through the drain line LD, as illustrated in FIG. 2 and a flow path allowing the first port 411, connected to the chamber water line LLW, to be in communication with the third port 413, connected to the entrance line LEI, in order to supply water (domestic water) from the filtering portion 200 to the second chamber 320, as illustrated in FIG. 3.

In other words, as illustrated in FIG. 2, in a case in which a flow path is converted in the flow path conversion valve 400 to allow the third port 413 to be in communication with the second port 412, the extraction portion 700 is closed, so that purified water that has been filtered in the reverse osmosis filter 250 may be stored in the first chamber 310 of the storage portion 300, through the purified water line LPW and the purified water supply line LPW1. Since purified water is supplied to the first chamber 310, water (domestic water) stored in the second chamber 320 may be drained outwardly through the drain line LD after passing through the entrance line LEI and the drain connection line LDS.

In addition, as illustrated in FIG. 3, in a case in which a flow path is converted in the flow path conversion valve 400 to allow the first port 411 to be in communication with the third port 413, domestic water not filtered in the reverse osmosis filter 250 may flow in the chamber water line LLW and the entrance line LEI to flow into the second chamber 320 of the storage portion 300. Since the extraction portion 700 has been opened, if domestic water flows into the second chamber 320, purified water accommodated in the first chamber 310 may be discharged into the extraction portion 700 through the purified water supply line LPW1 and a discharge line LE, to be provided to a user.

An example of the flow path conversion valve 400 will be described with reference to FIGS. 16 to 20.

FIG. 16 is a cross-sectional view of an example of a flow path conversion valve 400 disposed in a water treatment apparatus according to an example; FIG. 17 is a cross-sectional view of a modified example of the flow path conversion valve 400 illustrated in FIG. 16; FIG. 18 is a cross-sectional view of a different modified example of the flow path conversion valve 400 illustrated in FIG. 16; FIG. 19 is a cross-sectional view illustrating a state of the flow path of the flow path conversion valve 400 illustrated in FIG. 16, when purified water is stored; and FIG. 20 is a cross-sectional view illustrating the state of the flow path of the flow path conversion valve 400 illustrated in FIG. 16, when purified water is extracted.

As illustrated in FIG. 16, the flow path conversion valve 400 may be configured to include a first body portion 410 and a second body portion 420.

The first body portion 410 may include a first port 411 connected to a chamber water line LLW in which domestic water that has not passed through a reverse osmosis filter flows, a second port 412 connected to a drain line LD, and a third port 413 connected to the second chamber 320.

In addition, the first body portion 410 may include a plunger 430 disposed to be movable therein. The plunger 430 may allow an entrance line LEI connected to the third port 413 to be in communication with a drain connection line LDS connected to the second port 412 (see FIG. 19) or to be in communication with a chamber water line LLW connected to the first port 411 (see FIG. 20), depending on a position thereof.

A moving portion 414, including the plunger 430 disposed to be movable therein, may be formed in the first body portion 410. In addition, the moving portion 414 may be connected to the first port 411, the second port 412, and the third port 413. Thus, the moving portion 414 may be connected to the chamber water line LLW, the drain connection line LDS, and the entrance line LEI, respectively.

In this case, the first port 411, the second port 412, and the third port 413 may be formed to have a difference in height, in order to form a flow path allowing the third port 413 to be in communication with the second port 412 (see FIG. 19) or in order to form a flow path allowing the first port 411 to be in communication with the third port 413 (see FIG. 20), depending on a position of the plunger 430. In other words, in a case in which the plunger 430 is moved in an upward direction, the first port 411 may be configured to be closed. In a case in which the plunger 430 is moved in a downward direction, the second port 412 may be configured to be closed.

In addition, a pressure transfer portion 415 connected to the second body portion 420 may be formed in the first body portion 410.

The first body portion 410 may include a pressing portion 440 disposed to be movable therein. The pressing portion 440 may be disposed to be movable in the pressure transfer portion 415 of the first body portion 410.

In addition, the pressing portion 440 may move the plunger 430, depending on a difference in power applied by pressure of the first body portion 410 and the second body portion 420 and, in detail, by a change in pressure of water flowing in the extraction line LE.

The pressing portion 440 may be configured to include a pressing member 441, a first diaphragm 442, and a second diaphragm 443, as illustrated in FIGS. 16 and 18, and may be configured to include the pressing member 441 and the first diaphragm 442, as illustrated in FIG. 17.

In this case, the pressing member 441 may be configured to be in direct or indirect contact with the plunger 430. In other words, the pressing member 441 may be configured to be in direct contact with the plunger 430, as illustrated in FIG. 17. The pressing member 441 may also be configured to be in indirect contact with the plunger 430 by the second diaphragm 443, as illustrated in FIGS. 16 and 18.

The first diaphragm 442 is connected to the pressing member 441, in order to receive pressure of water flowing in the extraction line LE, which is transferred to the second body portion 420. The second diaphragm 443 is connected to the pressing member 441, to be in contact with the plunger 430.

A configuration of the pressing portion 440 is not limited to an example illustrated in FIGS. 16 to 18. The pressing portion 440 may have any known configuration allowing the pressing portion 440, to be disposed in the first body portion 410, to be movable and allowing the plunger 430 to be moved depending on a difference in pressure of the first body portion 410 and the second body portion 420 or depending on the pressure of water flowing in the extraction line LE.

In addition, the second body portion 420 may be configured to be connected to the first body portion 410 and may be connected to the extraction line LE, in order to receive pressure of the extraction line LE.

In the second body portion 420, a connection flow path 421 connecting the extraction line LE to a connection discharge line LCE may be formed. In other words, the discharge line LE may be connected to the fourth port 424, one side of the connection flow path 421, while the connection discharge line LCE may be connected to the fifth port 425, the other side of the connection flow path 421. However, a configuration of the second body portion 420 is not limited to a configuration in which the fourth port 424 and the fifth port 425 are included, as illustrated in FIGS. 16 to 20. In a case in which the second body portion 420 may receive pressure of the extraction line LE, the configuration of the second body portion 420 may vary.

For example, either the fourth port 424 or the fifth port 425 may be closed, while the other port may be connected to the extraction line LE by a separate flow path.

In addition, in the connection flow path 421, a connection hole 421a connected to the pressure transfer portion 415 of the first body portion 410 may be formed. Thus, pressure of the connection flow path 421 of the second body portion 420 may be transferred to the first diaphragm 442 of the pressing portion 440 through the connection hole 421a.

In the meantime, as illustrated in FIG. 16, the second body portion 420 may be connected to the first body portion 410 in such a manner that a conceptual line connecting the second port 412 to the third port 413 of the first body portion 410 is parallel with the connection flow path 421, but may also be inclined with respect thereto, for example, in a direction perpendicular thereto, for the sake of convenience of connection between the discharge line LE and the connection discharge line LCE. In addition, the second body portion 420 and the first body portion 410 may also be configured so that the connection flow path 421 of the second body portion 420 may forma specific angle with a conceptual line connecting the second port 412 to the third port 413 of the first body portion 410.

For example, the first body portion 410 and the second body portion 420 may be formed to be cylindrical, cubic, or rectangular.

In the meantime, as illustrated in FIG. 18, the plunger 430 may be configured to be elastically supported by an elastic member 431. For example, the elastic member 431 may be disposed on the plunger 430 to elastically support an upper side of the plunger 430. Thus, elastic force of the elastic member 431 may be applied to the upper side of the plunger 430.

Thus, in a case in which the plunger 430 is moved in a downward direction due to a decrease in pressure applied to the connection flow path 421 formed in the second body portion 420 (see FIG. 20), even in the case in which pressure applied to the upper side of the plunger 430 by water flowing into the first port 411 is relatively low, the plunger 430 may be easily moved in the downward direction, since elastic force of the elastic member 431 is applied thereto together.

In addition, in a case in which power applied to the first diaphragm 442 of the pressing portion 440 by pressure applied to the connection flow path 421 formed in the second body portion 420 is greater than power applied to the upper side of the plunger 430 by domestic water, the plunger 430 may be moved in an upward direction (see FIG. 19). In this case, as illustrated in FIG. 18, in a configuration in which the upper side of the plunger 430 is elastically supported by the elastic member 431, the plunger 430 may be moved in the upward direction only in a case in which the power applied to the first diaphragm 442 of the pressing portion 440 is greater than a sum of the power applied to the upper side of the plunger 430 by domestic water and elastic force applied to the upper side of the plunger 430 by the elastic member 431.

Thus, if unnecessary, the plunger 430 may be prevented from being moved in the upward direction due to power applied to the first diaphragm 442 of the pressing portion 440, by pressure applied to the connection flow path 421 of the second body portion 420. Thus, an operation of the plunger 430 may be reliably performed.

In addition, the elastic member 431 may elastically support not only the upper side of the plunger 430, but also a lower side of the plunger 430. The elastic member 431 may also elastically support an entirety of the upper side and the lower side thereof using a plurality of elastic members 431.

The elastic member 431 is not limited to a coil spring illustrated in FIG. 18. The elastic member 431 may include any known spring, such as a leaf spring, or the like, allowing the plunger 430 to be elastically supported.

The flow path conversion valve 400 having a configuration described above forms a flow path allowing the third port 413 to be in communication with the second port 412, as illustrated in FIG. 19, or forms a flow path allowing the first port 411 to be in communication with the third port 413, as illustrated in FIG. 20, depending on a position of the plunger 430.

In other words, in a case in which the extraction portion 700 is closed, the pressure of the extraction line LE is greater than or equal to the set pressure. Thus, the power applied to the first diaphragm 442 of the pressing portion 440 by pressure applied to the connection flow path 421, in communication with the extraction line LE, becomes greater than power applied to the plunger 430 by pressure applied to a flow path connected to the first port 411, the second port 412, and the third port 413. Thus, as illustrated in FIG. 19, the first diaphragm 442 is moved in the upward direction, and the plunger 430 is moved in the upward direction, thereby closing the first port 411. Thus, the third port 413 connected to the entrance line LET is in communication with the second port 412 connected to the drain connection line LDS, so that domestic water accommodated in the second chamber 320 may be drained through the drain connection line LDS and the drain line LD.

In this case, pressure of the chamber water line LLW is formed to be higher than pressure of the extraction line LE, but an area in which the first diaphragm 442 is in contact with water that has flowed into the connection flow path 421, connected to the extraction line LE, is formed to be greater than an area in which the plunger 430 is in contact with water that has flowed into the first port 411. Thus, even in the case in which the pressure of the extraction line LE is lower than that of the chamber water line LLW, the plunger 430 and the pressing portion 440 may be moved toward the first port 411, to close the first port 411 and form a flow path connecting the second port 412 to the third port 413. In addition, the area in which the plunger 430 is in contact with water that has flowed into the first port 411 and the area in which the first diaphragm 442 is in contact with water that has flowed into the connection flow path 421 connected to the extraction line LE may be adjusted, thereby setting the pressure of the extraction line LE, forming a flow path closing the first port 411. The set pressure is merely an example and may be set as a value selected from a range of 20% to 40% of hydraulic pressure.

In addition, in a case in which the extraction portion 700 is opened, the pressure of the extraction line LE is reduced to be lower than the set pressure. Thus, the power applied to the first diaphragm 442 of the pressing portion 440 by pressure applied to the connection flow path 421, in communication with the extraction line LE, becomes lower than power applied to the plunger 430 by pressure applied to a flow path connected to the first port 411, the second port 412, and the third port 413. Thus, as illustrated in FIG. 20, the first diaphragm 442 is moved in the downward direction, and the plunger 430 is moved in the downward direction, thereby closing the third port 413. Thus, the first port 411, connected to the chamber water line LLW, is in communication with the third port 413, connected to the entrance line LEI, so that domestic water supplied through the chamber water line LLW may be supplied to the second chamber 320.

[Automatic Shut-Off Valve 500]

Subsequently, with reference to FIGS. 1 to 4 and FIGS. 21 to 24, an automatic shut-off valve 500 will be described.

The automatic shut-off valve 500 blocks an inflow of raw water in a case in which pressure of an interior of the storage portion 300 is higher than or equal to the set pressure, or pressure in a flow path connecting the storage portion 300 to the extraction portion 700 is higher than or equal to the set pressure.

With reference to FIGS. 1 to 4 and FIGS. 21 to 24, the automatic shut-off valve 500 includes a first flow path portion (see 531 of FIG. 22) in which raw water or water that has passed through at least a portion of filters disposed in the filtering portion 200 flows, and includes a second flow path portion (see 521 of FIG. 22) connected to the pressure transfer line LP, divided in a flow path connecting the storage portion 300 to the extraction portion 700.

In this case, a first flow path portion 531 may include a first port 511 and a second port 512 and may be disposed in a front portion of the filtering portion 200, a rear portion thereof, or in an interior thereof. In detail, as illustrated in FIGS. 1 to 4, the first flow path portion 531 may be connected to a front portion of the reverse osmosis filter 250. However, in a case in which the inflow of raw water may be blocked, a position thereof is not limited thereto. In other words, the first flow path portion 531 may be disposed in the raw water line LRW disposed in a front portion of a first filter 210, may be disposed between the first filter 210 and a second filter 220, and may be disposed between the reverse osmosis filter 250 and an additional filter 260.

In addition, a second flow path portion 521 may be connected to the pressure transfer line LP, in order to receive pressure of the extraction line LE.

The pressure transfer line LP may be configured to be divided in a pressure line connection portion TC3, a point connecting purified water discharge lines LPW2 and LPW3, disposed on a flow path connecting the storage portion 300 to the extraction portion 700, to the extraction line LE, as illustrated in FIGS. 1 to 4.

While the extraction portion 700 is closed, purified water is supplied to the first chamber 310 of the storage portion 300. Thus, due to pressure of raw water, pressure of an extraction connection line LCE and the extraction line LE, connected to the extraction portion 700, is gradually increased by pressure of raw water. Increased pressure of the extraction line LE is transferred to the second flow path portion 521 of the automatic shut-off valve 500 by the pressure transfer line LP. In this case, the second flow path portion 521 includes a third port 513 and a fourth port 514, the third port 513 is connected to the pressure transfer line LP, and the fourth port 514 is closed by a capping member 550, such as a plug, a valve, or the like. Thus, pressure transferred to the second flow path portion 521 is equal to that of the extraction line LE.

In addition, since a second check valve CV2 is disposed in the purified water discharge lines LPW2 and LPW3, purified water accommodated in the extraction line LE may not flow back toward the storage portion 300 or the reverse osmosis filter 250. Thus, in a case in which an extraction of purified water through the extraction portion 700 is stopped, pressure of the extraction connection line LCE, the extraction line LE, and the pressure transfer line LP have the same value.

As such, in a case in which pressure of the extraction line LE and the pressure transfer line LP is gradually increased, pressure applied to the second flow path portion 521 is gradually increased. In a case in which the pressure applied to the second flow path portion 521 is greater than or equal to the set pressure, the first flow path portion 531 of the automatic shut-off valve 500 may be closed.

An example of the automatic shut-off valve 500 will be described with reference to FIGS. 21 to 24.

FIG. 21 is a perspective view of an example of an automatic shut-off valve 500 disposed in a water treatment apparatus according to an example; FIG. 22 is a cross-sectional view of the automatic shut-off valve 500 illustrated in FIG. 21; FIG. 23 is a cross-sectional view illustrating a state in which water flows in a first flow path portion 531 of the automatic shut-off valve 500 illustrated in FIG. 22; and FIG. 24 is a cross-sectional view illustrating a state in which a water flow is blocked in the first flow path portion 531 of the automatic shut-off valve 500 illustrated in FIG. 22.

As illustrated in FIGS. 21 to 24, the automatic shut-off valve 500 includes a first body portion 530 including a first flow path portion 531, a second body portion 520 including a second flow path portion 521, and a blocking member 540 blocking the first flow path portion 531 in a case in which pressure of the second flow path portion 521 is higher than or equal to the set pressure.

The first body portion 530 includes the first port 511 and the second port 512, connected to opposing ends of the first flow path portion 531, respectively, as described above. The first flow path portion 531 has a curved flow path structure, allowing the first flow path portion 531 to be closed in a case in which the pressure of the second flow path portion 521 is increased.

In addition, the second body portion 520 has a structure in which an exterior of the first body portion 530 is connected thereto. The blocking member 540 is interposed between the first body portion 530 and the second body portion 520.

In this case, the blocking member 540 is disposed to receive pressure of water flowing in the first flow path portion 531 and the second flow path portion 521, in order to limit a flow of water flowing in the first flow path portion 531 according to an increase in the pressure of the second flow path portion 521.

In other words, the blocking member 540 is configured such that one side of the blocking member 540 is in contact with water flowing in the first flow path portion 531, and the other side thereof is in contact with water flowing in the second flow path portion 521.

To this end, the first body portion 530 is configured in such a manner that a portion of the first flow path portion 531 is in direct communication with the blocking member 540. The second body portion 520 may have a structure in which a communication hole 522 is formed on an outer circumferential surface thereof for water of the second flow path portion 521 to flow toward the blocking member 540.

In addition, the blocking member 540 may include a first diaphragm DPL, pressurized by being in contact with water flowing in the first flow path portion 531, and may include a second diaphragm DPU, pressurized by being in contact with water flowing in the second flow path portion 521.

In this case, the first diaphragm DPL and the second diaphragm DPU may be formed using a flexible material to be able to be changed depending on the pressure of the second flow path portion 521. In other words, the first diaphragm DPL and the second diaphragm DPU may be formed using a flexible material, to be movable between a state in which water flows in the first flow path portion 531, illustrated in FIG. 23 and a state in which a water flow is blocked in the first flow path portion 531, illustrated in FIG. 24.

In addition, the blocking member 540 may include an elevating member 541 interposed between the first diaphragm DPL and the second diaphragm DPU. The elevating member 541 may be formed using a material having uniform hardness, in order to support the first diaphragm DPL and the second diaphragm DPU having a flexible material, as well as to be moved in the same manner as the first diaphragm DPL and the second diaphragm DPU.

In addition, the blocking member 540 may include a guide member 542 guided by a guide protrusion 532 of the first body portion 530, in order to guide movement of the elevating member 541.

In this case, a sealing member OR2 is disposed in a vicinity of the guide member 542, thereby closing the first flow path portion 531, depending on movement of the blocking member 540. However, a configuration of the blocking member 540 to close the first flow path portion 531 is not limited to FIGS. 22 to 24, but may be variously changed. For example, the first diaphragm DPL may be configured to directly close the first flow path portion 531.

With reference to FIGS. 1 to 4, the first flow path portion 531 is connected to a connection line LC interposed between a second filter 220 and a reverse osmosis filter 250. Thus, raw water from a raw water flow path LRW flows in the first flow path portion 531 while pressure thereof is reduced, after passing through a first filter 210 and the second filter 220. In addition, in the case of the second flow path portion 521, since raw water has passed through the reverse osmosis filter 250 and an additional filter 260, pressure of the raw water introduced from the raw water flow path LRW has been reduced to a specific level. Thus, pressure of water in the first flow path portion 531 is higher than that of water in the second flow path portion 521. In the state described above, in order to block the first flow path portion 531 by moving the blocking member 540 toward the first flow path portion 531 by the pressure of water in the second flow path portion 521, a diameter D2 of a pressing portion of the second diaphragm DPU may be configured to be greater than a diameter D1 of a pressing portion of the first diaphragm DPL.

With reference to FIGS. 22 to 24, a ratio of the diameter D1 of the pressing portion, in which the first diaphragm DPL is in contact with the first flow path portion 531, to the diameter D2 of the pressing portion in which the second diaphragm DPU is in contact with the second flow path portion 521, may be adjusted, thereby moving the blocking member 540 toward the first flow path portion 531 by the pressure of water in the second flow path portion 521 to close the first flow path portion 531.

In this case, the set pressure to operate the automatic shut-off valve 500 may be set to be in a range of 40% to 80% of hydraulic pressure, in detail, a range of 50% to 70%. In other words, when pressure in an interior of a storage portion 300 is higher than or equal to pressure set between 40% to 80% of hydraulic pressure, or when pressure in a flow path connecting the storage portion 300 to the extraction portion 700 is higher than or equal to pressure set between 40% to 80% of hydraulic pressure, the automatic shut-off valve 500 may block a flow of raw water thereinto.

For example, in a case in which the set pressure is set to be 60% of hydraulic pressure, when pressure of the extraction line LE and the pressure transfer line LP connected thereto is higher than or equal to 60% of hydraulic pressure, the diameter D2 of the pressing portion of the second diaphragm DPU and the diameter D1 of the pressing portion of the first diaphragm DPL may be set to close the first flow path portion 531 by the pressure of water in the second flow path portion 521.

In the meantime, in a case in which the set pressure is set to be higher than or equal to 80% of hydraulic pressure, pressure of raw water is reduced while raw water passes through a plurality of filters disposed in a filtering portion 200. Thus, pressure of water flowing in the extraction line LE may not reach the set pressure. In this case, even in the case in which a first chamber 310 of the storage portion 300 is completely filled, an introduction of raw water may not be blocked. In addition, in a case in which the set pressure is set to be lower than 40% of hydraulic pressure, pressure of the extraction line LE is significantly low. Thus, the automatic shut-off valve 500 may be operated while the first chamber 310 of the storage portion 300 is not completely filled with purified water.

In consideration of the foregoing, the set pressure is required to be set to be in a range of 40% to 80% of hydraulic pressure. For the sake of more stable operation, the set pressure may be set to be in a range of 50% to 70% of hydraulic pressure. In other words, even in an area having relatively low water pressure, the set pressure may be selected from values lower than or equal to 70% of hydraulic pressure so that pressure of the extraction line LE may reach the set pressure. In addition, the set pressure may be selected from values higher than or equal to 50% of hydraulic pressure so that the first chamber 310 of the storage portion 300 may be sufficiently filled with purified water.

In the meantime, a fitting member (a number thereof is not illustrated) and a sealing member OR may be disposed in the first port 511, the second port 512, a third port 513, and a fourth port 514, so that the connection line LC of the filtering portion 200, the pressure transfer line LP, a capping member 550, and the like, may be configured to be easily connected.

With reference to FIG. 23, pressure is transferred to the second flow path portion 521 through the third port 513 connected to the pressure transfer line LP, while the fourth port 514 is closed by the capping member 550, as illustrated in FIGS. 1 to 4. Thus, pressure of the second flow path portion 521 is maintained to be equal to that of the pressure transfer line LP.

In the meantime, in a case in which the extraction portion 700 is closed, purified water that has been filtered by pressure of raw water may not be discharged through the extraction portion 700. Thus, the purified water is supplied to the storage portion 300. As the purified water is supplied to the storage portion 300, a volume of the first chamber 310 is increased, and a volume of the second chamber 320 is reduced. In a case in which the first chamber 310 is filled with purified water, the purified water may not continue to be supplied to the storage portion 300, thereby increasing pressure of the purified water supply line LPW1.

Due to an increase in pressure of the purified water supply line LPW1, pressure of the extraction line LE, connected thereto, is also increased. The pressure of the extraction line LE is transferred to the second flow path portion 521 through the pressure transfer line LP.

With reference to FIG. 24, in a case in which pressure transferred to the second flow path portion 521 through the pressure transfer line LP is higher than or equal to the set pressure, pressure of the second diaphragm DPU is increased by water in the second flow path portion 521.

In this case, pressure is also transferred to the first diaphragm DPL by water in the first flow path portion 531. In the situation described above, in a case in which power by pressure transferred to the second diaphragm DPU is higher than power by pressure transferred to the first diaphragm DPL, the elevating member 541, including the second diaphragm DPU attached thereto and the first diaphragm DPL, are moved toward the first flow path portion 531. Thus, as illustrated in FIG. 24, the first flow path portion 531 may be closed by the sealing member OR2.

In the meantime, in a case in which the first chamber 310 is filled with a specific amount of purified water or more, the volume of the first chamber 310 reaches the maximum volume or substantially reaches the maximum volume, so that purified water may not be supplied to the first chamber 310 of the storage portion 300. Thus, pressure of the first chamber 310 is increased to be a specific level of pressure or higher. The pressure thereof is transferred to the purified water supply line LPW1, the extraction line LE, and the pressure transfer line LP. Thus, in a case in which pressure in an interior of the storage portion 300 is higher than or equal to the set pressure, supply of raw water may also be blocked by the automatic shut-off valve 500.

[Pressure Reducing Valve 600]

The pressure reducing valve 600 is disposed to reduce fluctuation pressure formed when the flow path conversion valve 400 converts a flow path.

To this end, the pressure reducing valve 600 is configured to be disposed on a flow path between the storage portion 300 and the flow path conversion valve 400, as illustrated in FIGS. 1 to 4, in order to reduce pressure of purified water flowing in a direction from the storage portion 300 to the flow path conversion valve 400.

As described above, in the case of the flow path conversion valve 400, a flow path is converted depending on pressure of the extraction line LE in which purified water flows toward the extraction portion 700. The flow path conversion valve 400 is configured to comprise a first body portion 410 including the first port 411 connected to a chamber water line LLW, the second port 412 connected to a drain line LD, and the third port 413 connected to the second chamber 320, as well as a second body portion 420 connected to the extraction line LE so that domestic water that has not passed through the reverse osmosis filter 250 may flow into the first port 411. As described above, a flow path allowing purified water to be moved from the storage portion 300 to the extraction portion 700 is formed in the flow path conversion valve 400 in a case in which pressure of the extraction line LE is lower than the set pressure. In a case in which the pressure of the extraction line LE is higher than the set pressure, a flow path allowing purified water to be stored in the storage portion 300 is formed in the flow path conversion valve 400. Thus, a flow path is converted between a flow path supplying water discharged from the filtering portion 200 to the second chamber 320 and a flow path discharging water from the second chamber 320 through the drain line LD.

In a case in which a flow path is converted in the flow path conversion valve 400, that is, in a process of being converted into a purified water storage process immediately after an extraction of purified water, the first diaphragm DPL is vibrated to find a balance of pressure, and a chattering phenomenon occurs, due to a change of a difference in pressure of the extraction line LE and pressure of a fluid flowing in the first body portion 410 of the flow path conversion valve 400. Thus, a noise and vibration are generated.

In order to prevent the chattering phenomenon, the pressure reducing valve 600 is disposed between the third port 413 of the flow path conversion valve 400 and the second chamber 320 of the storage portion 300.

The pressure reducing valve 600 reduces fluctuation pressure in a direction from the storage portion 300 to the flow path conversion valve 400 when water stored in the second chamber 320 is discharged through the drain line LD. Thus, pressure of water flowing in the pressure reducing valve 600 may be maintained to be lower than or equal to the set pressure. Since pressure of water flowing into the flow path conversion valve 400 may be maintained to be lower than or equal to the set pressure by a reduction in pressure by the pressure reducing valve 600, the chattering phenomenon of the flow path conversion valve 400 may be prevented.

However, the pressure reducing valve 600 is configured not to act as a resistance in a water flow in a direction from the flow path conversion valve 400 to the storage portion 300. Thus, since water flowing into the pressure reducing valve 600 from the third port 413 of the flow path conversion valve 400 passes through the pressure reducing valve 600 without resistance being supplied to the second chamber 320 of the storage portion 300, the volume of the second chamber 320 may be easily increased. Thus, purified water stored in the first chamber 310 may be easily discharged.

In addition, the pressure reducing valve 600 has a structure in which a flow path between the second chamber 320 and the third port 413 is blocked when the second chamber 320 is filled with purified water and an entirety of purified water in the first chamber 310 is discharged. Thus, when purified water in an interior of a partition member 340 is exhausted, a housing 330 may be prevented from being damaged by hydraulic pressure.

An example of the pressure reducing valve 600 will be described with reference to FIGS. 25 to 29.

FIG. 25 is a perspective view of an example of a pressure reducing valve disposed in a water treatment apparatus according to an example; FIG. 26 is a cross-sectional view of the pressure reducing valve 600 illustrated in FIG. 25; FIG. 27 is a cross-sectional view illustrating a state in which water flows in the pressure reducing valve 600 illustrated in FIG. 26; FIG. 28 is a cross-sectional view illustrating a state in which a water flow is reduced to be lower than the case of FIG. 27; and FIG. 29 is a cross-sectional view illustrating a state in which a water flow of the pressure reducing valve 600, illustrated in FIG. 26, is blocked.

As illustrated in FIG. 26, the pressure reducing valve 600 includes an internal body portion 620 and an external body portion 630. An elastic member 650 compressed or tensioned according to movement of a moving member 640, is disposed between the internal body portion 620 and the external body portion 630.

The moving member 640 has a structure in which a mounting portion 642 including a closing member 660, disposed adjacent to a second entrance 612 therein, is formed, a side surface flow path 643 is formed on a perimeter of the mounting portion 642, and a central opening 644 is formed in a center of the mounting portion 642.

In addition, the closing member 660 closes an opening 621 of the internal body portion 620 or changes a thickness (length) L of a variable flow path disposed between the opening 621 and the closing member 660, according to movement of the moving member 640.

In addition, a first entrance 611, connected to a second chamber 320 of a storage portion 300, is formed in the internal body portion 620 disposed on one side of the pressure reducing valve 600. The second entrance 612, connected to a third port 413 of a flow path conversion valve 400, is formed in the external body portion 630 disposed on the other side of the pressure reducing valve 600. In the first entrance 611 and the second entrance 612, a connection member FC, such as a fitting member, or the like, may be disposed to facilitate a connection of pipes.

In the meantime, the sealing member OR is disposed between an internal surface of the moving member 640 and an external surface of the internal body portion 620, as well as between an external surface of the moving member 640 and an internal surface of the external body portion 630, in order to limit a water flow.

The elastic member 650, disposed in the pressure reducing valve 600, maintains a state of being tensioned when pressure of the elastic member 650 is lower than or equal to the set pressure. The elastic member 650 is compressed, so that the pressure thereof may be reduced when the pressure thereof is higher than or equal to the set pressure.

In detail, as illustrated in FIG. 27, when water flows in a forward direction in a process of purifying water, in a case in which pressure in the second entrance 612 or an outlet portion is lower than or equal to the set pressure, the elastic member 650 is maintained to be in a state of being tensioned to a maximum extent thereof, and water flows freely in a direction from the first entrance 611 to the second entrance 612 of the pressure reducing valve 600.

However, when a process of extracting purified water is converted into the process of purifying water, a chattering phenomenon is generated in a process of converting a flow path of the flow path conversion valve 400. Due to the chattering phenomenon, pressure in the second entrance 612 is increased to be higher than or equal to the set pressure. As such, in a case in which the pressure in the second entrance 612 is increased to be higher than or equal to the set pressure, the moving member 640 and the closing member 660 compress the elastic member 650 and are moved toward the first entrance 611, as illustrated in FIG. 28. Thus, a width L1 of a variable flow path disposed between an opening 621 of the internal body portion 620 and the closing member 660 is reduced. As such, in a case in which the pressure in the second entrance 612 is increased to be higher than or equal to the set pressure, the width L1 of a variable flow path is reduced, thereby reducing an amount of water. Thus, the pressure in the second entrance 612 may be maintained to be lower than or equal to the set pressure, thereby preventing or minimizing the chattering phenomenon.

In the meantime, in the process of extracting purified water, water may flow in a reverse direction from the second entrance 612, connected to the third port 413 of the flow path conversion valve 400, to the first entrance 611, connected to the second chamber 320 by flow path conversion of the flow path conversion valve 400.

In a process of a water flow in the reverse direction, pressure of an inlet portion is lower than or equal to the set pressure. Thus, the elastic member 650 is maintained to be in a state of being tensioned to the maximum extent thereof, while water flows without flow path resistance. However, in a case in which an entirety of the first chamber 310 is emptied, and the second chamber 320 is filled, the pressure of the inlet portion is higher than or equal to the set pressure. Thus, as illustrated in FIG. 29, the elastic member 650 is compressed to a maximum extent thereof, so that the closing member 660 may close the opening 621 of the internal body portion 620.

Ina case in which pressure of raw water is constantly applied to the second chamber 320, while the second chamber 320 of the storage portion 300 is filled, a housing 330 of the storage portion 300 may be damaged. However, as such, the pressure reducing valve 600 may further act as a safety device, preventing damage to the housing 330 by blocking a flow path between the second chamber 320 and the third port 413 of the flow path conversion valve 400.

[Air Supply Portion (AP)]

Finally, an air supply portion AP may be disposed on a flow path connected to the storage portion 300, in order to supply air to the storage portion 300.

The air supply portion AP may be disposed to discharge water accommodated in an interior of the storage portion 300, to confirm water leakage in a flow path and/or the storage portion 300, or to confirm whether or not there is a defect in a component thereof disposed on a flow path in a process of manufacturing and using the storage portion 300.

The storage portion 300 is configured to include the first chamber 310 and the second chamber 320. The first chamber 310, accommodating purified water, may be emptied by completely extracting purified water, while the second chamber 320 may be emptied by completely filling the first chamber 310 with purified water.

However, the first chamber 310 and the second chamber 320 are divided by a partition member 340, formed using a flexible material. Thus, there is a limitation in installing a separate valve structure for a drain, such as a stationary-type storage tank of the related art.

Thus, air may be supplied to either the first chamber 310 or the second chamber 320, divided from each other by the partition member 340 formed using a flexible material, thereby discharging water accommodated in the other chamber.

To this end, the air supply portion AP may be connected to a purified water line LPW supplying purified water that has been filtered by passing through at least a portion of filters disposed in the filtering portion 200 to the storage portion 300. In other words, as illustrated in FIG. 4, in a case in which a purified water supply line LPW1, in which purified water supplied by the purified water line LPW is supplied to the storage portion 300, and an extraction line LE, in which purified water supplied by the purified water line LPW is supplied to the extraction portion 700, are disposed, the air supply portion AP may be disposed in a purified water branch portion TC2, in which the purified water line LPW is divided into a flow path connected to the extraction line LE and the purified water supply line LPW1.

In addition, the air supply portion AP is disposed in the purified water branch portion TC2 on a flow path connected to the first chamber 310. Thus, a volume of the first chamber 310 may be increased by supplying air to the first chamber 310 through the air supply portion AP, while water accommodated in the second chamber 320 may be discharged by reducing a volume of the second chamber 320. In this case, the second chamber 320 may be configured to be connected to a drain line LD so that the water accommodated in the second chamber 320 may be discharged through the drain line LD.

Thus, after purified water accommodated in the first chamber 310 of a purified water portion is completely discharged by opening the extraction portion 700, air may be supplied to the first chamber 310 through the air supply portion AP, thereby completely discharging the water accommodated in the second chamber 320. Thus, in an operation of manufacturing a water treatment apparatus 100, in a case in which a transfer of the water treatment apparatus 100 is required, or in a case in which the storage portion 300 is required to be cleaned since the water treatment apparatus 100 is not used for a relatively long time, water accommodated in an interior of the storage portion 300 may be discharged, even in the case in which the storage portion 300 is not detached therefrom.

In the meantime, the air supply portion AP may be configured to include a flow path connected to the storage portion 300, that is, a port disposed in the purified water branch portion TC2. Thus, air may be easily supplied to the storage portion 300 only by connecting the port to a pipe or a device for supplying air.

In addition, the air supply portion AP may have a valve structure in which a flow path is closed, in a case in which air is not supplied thereto, and is opened, in a case in which air is supplied thereto. Thus, in a case in which air is required to be supplied, air may be easily supplied only by connecting the pipe or the device for supplying air to the air supply portion AP and opening a valve thereof. The valve may be configured to have a mechanical valve structure in which an elastic member is included to allow a flow path to be opened when the pipe or the device for supplying air is connected thereto and to be closed when the pipe or the device for supplying air is disconnected therefrom, but is not limited thereto.

In the meantime, with reference to FIG. 4, the purified water line LPW may include a first check valve CV1, disposed to prevent purified water from flowing back from the purified water branch portion TC2 to the filtering portion 200 in a front portion of the purified water branch portion TC2. In addition, a second check valve CV2 may be disposed between the purified water branch portion TC2 and the extraction portion 700, in order to prevent purified water from flowing back toward the purified water branch portion TC2. An additional filter 260 may be disposed in purified water discharge lines LPW2 and LPW3 connecting the purified water branch portion TC2 to the extraction line LE, in order to further filter purified water passing through the second check valve CV2. Furthermore, the extraction line LE is configured to be connected to the automatic shut-off valve 500 through the pressure transfer line LP.

As such, in the case of the water treatment apparatus 100 having a flow path structure of FIG. 4, air is supplied to the air supply portion AP, thereby discharging water accommodated in the second chamber 320 and confirming water leakage in a flow path and/or in the storage portion 300 or confirming whether or not there is a defect in a component thereof disposed on a flow path.

In a case in which air is supplied to the air supply portion AP, air is supplied to the first chamber 310, so that the volume of the first chamber 310 is increased, and the water accommodated in the second chamber 320 may be discharged. In a case in which the water accommodated in the second chamber 320 is completely discharged, pressure of air introduced from the air supply portion AP is transferred to the purified water supply line LPW1 connected to the air supply portion AP, the purified water line LPW between the first check valve CV1 and the purified water branch portion TC2, the purified water discharge lines LPW2 and LPW3 between the purified water branch portion TC2 and the pressure line connection portion TC3, the extraction line LE, the extraction connection line LCE, the pressure transfer line LP, and a second flow path portion 521 of the automatic shut-off valve 500.

Thus, even after the water accommodated in the second chamber 320 is completely discharged, in a case in which air is supplied through the air supply portion AP, it can be confirmed that there is water leakage in flow paths LPW, LPW1, LPW2, LPW3, LE, LCE, LP, and the second flow path portion 521, described above, connected to the air supply portion AP, or the storage portion 300, or water is flowing back through the first check valve CV1 to be discharged through the drain line LD due to a defect in a function of the first check valve CV1.

As such, in such a manner that the air supply portion AP is disposed on a flow path connected to the storage portion 300 in order to supply air to the storage portion 300, the water accommodated in an interior of the storage portion 300 may be discharged without disconnection of the storage portion 300, while water leakage of the flow path can be confirmed, or it can be confirmed whether or not there is a defect in a component thereof disposed on the flow path.

[Flow Path in Process of Purifying Water]

Subsequently, with reference to FIG. 2, operations of the water treatment apparatus 100, when purified water is stored, will be described.

In a state in which the extraction portion 700 is closed while the first chamber 310 of the storage portion 300 is not completely filled, pressure of the extraction line LE and the pressure transfer line LP connected thereto is lower than or equal to the set pressure. Thus, the automatic shut-off valve 500 is maintained to be opened.

In other words, in a case in which the first chamber 310 of the storage portion 300 is not completely filled, and an extraction of purified water is completed, the purified water may be supplied to the first chamber 310 of the storage portion 300.

As illustrated in FIG. 2, since the automatic shut-off valve 500 does not block an introduction of raw water, raw water from the raw water line LRW passes through the first filter 210, to be filtered, and pressure thereof is reduced to be lower than or equal to a specific level of pressure through the raw water pressure reducing valve REG, so that the raw water is supplied to the second filter 220. In addition, water that has been filtered in the second filter 220 flows into a reverse osmosis filter 250.

In this case, purified water that has been filtered by passing through the reverse osmosis filter 250 reaches the purified water branch portion TC2 through the purified water line LPW. Since the extraction portion 700 is closed, the purified water may be supplied to the first chamber 310 of the storage portion 300 through the purified water supply line LPW1.

In addition, domestic water that has not passed through the reverse osmosis filter 250 passes through a drain valve VR, to be discharged through the drain line LD. In this case, since the drain valve VR has a relatively narrow flow path and acts as a flow path resistance means, only a small amount of the domestic water (e.g., 0.2 lpm to 0.5 lpm) that has not passed through the reverse osmosis filter 250 may be discharged through the drain line LD.

In the meantime, in a case in which the extraction portion 700 is closed and/or in a case in which the purified water that has been filtered by passing through the reverse osmosis filter 250 is supplied to the first chamber 310, pressure of the first chamber 310 and the purified water line LPW, the purified water discharge lines LPW2 and LPW3, and the extraction line LE, connected to the first chamber 310, is increased, thereby increasing pressure of a connection flow path 421 of the flow path conversion valve 400.

In addition, in a case in which power applied to a first diaphragm 442 of a pressing portion 440 by pressure of the connection flow path 421 is higher than power applied to an upper side of a plunger 430 by domestic water of a chamber water line LLW flowing into the first port 411, the plunger 430 may be moved to a position in which an entrance line LEI is connected to a drain connection line LDS, that is, toward the upper side thereof, as illustrated in FIG. 19.

In other words, pressure of the chamber water line LLW is formed to be higher than that of the extraction line LE, but an area in which the first diaphragm 442 is in contact with water that has flowed into the connection flow path 421 connected to the extraction line LE is formed to be greater than an area in which the plunger 430 is in contact with water that has flowed into the first port 411. In a case in which the pressure of the extraction line LE is lower than that of the chamber water line LLW, the plunger 430 and the pressing portion 440 are moved toward the first port 411, to close the first port 411 and to form a flow path connecting the second port 412 to the third port 413.

As such, in a case in which the flow path connecting the second port 412 to the third port 413 is formed in the flow path conversion valve 400, water accommodated in the second chamber 320 of the storage portion 300 may flow in the entrance line LEI, to flow into the drain connection line LDS, and may be drained through the drain line LD, as illustrated in FIGS. 2 and 19. Thus, purified water may be stored continually in the first chamber 310 of the storage portion 300.

In the meantime, immediately after a process of extracting purified water is converted into a process of storing purified water, in a process of finding balance between the power applied to the upper side of the plunger 430 by domestic water of the chamber water line LLW that has flowed into the first port 411, and the power applied to the first diaphragm 442 of the pressing portion 440 by pressure of the connection flow path 421, the chattering phenomenon may occur in the flow path conversion valve 400.

In a case in which pressure of the second entrance 612 is increased to be higher than or equal to the set pressure, due to the chattering phenomenon in the pressure reducing valve 600 disposed in the entrance line LEI between the second chamber 320 and the third port 413 of the flow path conversion valve 400, the moving member 640 and the closing member 660 compress the elastic member 650 and are moved toward the first entrance 611, as illustrated in FIG. 28. Thus, the width L1 of the variable flow path disposed between the opening 621 of the internal body portion 620 and the closing member 660 is reduced, thereby maintaining the pressure of the second entrance 612 to be lower than or equal to the set pressure.

In addition, since the first port 411 is closed by the pressure of the extraction line LE, domestic water not filtered by the reverse osmosis filter 250 does not flow into the first port 411 through the chamber water line LLW, but drained outwardly through the drain line LD.

As such, when the purified water that has been filtered in the reverse osmosis filter 250 is stored in the first chamber 310 of the storage portion 300, no other pressure, except for pressure of the purified water, is applied to the first chamber 310. Thus, back pressure may not be applied to the reverse osmosis filter 250. Thus, an amount of the purified water that has been filtered in the reverse osmosis filter 250 and discharged therefrom may not be reduced, while filtering efficiency may not be decreased.

In the meantime, as purified water is supplied to the storage portion 300, the volume of the first chamber 310 is increased, and the volume of the second chamber 320 is reduced. In a case in which the first chamber 310 is filled with purified water, the purified water may not continue to be supplied to the storage portion 300, thereby increasing pressure of the purified water supply line LPW1.

As the pressure of the purified water supply line LPW1 is increased, pressure of the extraction line LE connected thereto is also increased. The pressure of the extraction line LE is transferred to the second flow path portion 521 of the automatic shut-off valve 500 through the pressure transfer line LP.

In this case, in a case in which pressure transferred to the second flow path portion 521 through the pressure transfer line LP is higher than or equal to the set pressure, pressure of the second diaphragm DPU is increased by water of the second flow path portion 521. In a situation described above, in a case in which power by pressure transferred to the second diaphragm DPU is greater than power by pressure transferred to the first diaphragm DPL, an elevating member attached to the second diaphragm DPU and the first diaphragm DPL are moved toward the first flow path portion 531. Thus, as illustrated in FIG. 24, the first flow path portion 531 is closed by a sealing member OR2, to block an introduction of raw water, so that the process of purifying water is finished.

As such, in a case in which a flow of raw water is blocked, since hydraulic pressure is not applied, water accommodated in an interior of the reverse osmosis filter 250 and water in the purified water line LPW, between the reverse osmosis filter 250 and the first check valve CV1 are discharged through the drain line LD by osmotic pressure. However, since the pressure of the extraction line LE is maintained to be equal to the set pressure by the first check valve CV1 and the second check valve CV2, the automatic shut-off valve 500 may be constantly maintained to be in a state of being closed.

[Flow Path when Purified Water is Extracted]

Subsequently, with reference to FIG. 3, operations of the water treatment apparatus 100, when purified water is extracted, will be described.

In a case in which the extraction portion 700 is opened while the first chamber 310 of the storage portion 300 is filled with purified water, purified water accommodated in the extraction line LE is discharged through the extraction portion 700, thereby reducing pressure of the extraction line LE.

Thus, pressure of the pressure transfer line LP connected to the extraction line LE is reduced, and the automatic shut-off valve 500 is opened, as illustrated in FIG. 23, so that raw water may be introduced from the raw water line LRW.

As illustrated in FIG. 3, since the automatic shut-off valve 500 does not block an introduction of raw water, raw water introduced from the raw water line LRW passes through the first filter 210 to be filtered, and pressure thereof is reduced to be lower than or equal to a specific level of pressure through the raw water pressure reducing valve REG, so that the raw water may be supplied to the second filter 220. In addition, water that has been filtered by the second filter 220 flows into the reverse osmosis filter 250.

In this case, purified water that has been filtered by passing through the reverse osmosis filter 250, reaches the purified water branch portion TC2 through the purified water line LPW. Since the extraction portion 700 is opened, the purified water passes through the purified water discharge lines LPW2 and LPW3, the extraction line LE, and the extraction connection line LCE, to be supplied to a user in the extraction portion 700.

In addition, domestic water that has not passed through the reverse osmosis filter 250 passes through the drain valve VR to be discharged through the drain line LD. In this case, since the drain valve VR has a relatively narrow flow path and acts as a flow path resistance means, only a small amount of the domestic water (e.g., 0.2 lpm to 0.5 lpm) that has not passed through the reverse osmosis filter 250 may be discharged through the drain line LD.

In the meantime, in a case in which the extraction portion 700 is opened, since purified water is discharged through the extraction portion 700, the pressure of the extraction line LE is reduced, as described above. Thus, since power applied to the first diaphragm DPL of the pressing portion 440, by pressure of the connection flow path 421 of the flow path conversion valve 400, is lower than power applied to the upper side of the plunger 430 by domestic water in the chamber water line LLW that has flowed into the first port 411, the plunger 430 is moved toward a lower side thereof, so that the first port 411, connected to the chamber water line LLW, may be in communication with the third port 413, connected to the entrance line LEI, as illustrated in FIG. 20.

Thus, domestic water that has not passed through the reverse osmosis filter 250 flows into the first port 411 of the flow path conversion valve 400 through the chamber water line LLW to flow into the second chamber 320 through the entrance line LEI connected to the third port 413. In this case, the flow path resistance means, limiting a discharge of domestic water that has not passed through the reverse osmosis filter 250, is disposed in the drain line LD. Thus, when domestic water is supplied to the second chamber 320 through the chamber water line LLW, an amount of domestic water supplied to the second chamber 320 through the chamber water line LLW is greater than an amount of domestic water discharged through the drain line LD. As such, since the amount of domestic water discharged through the chamber water line LLW is relatively large, and a flow velocity is relatively high, in a case in which domestic water is discharged through the chamber water line LLW, the reverse osmosis filter 250 is flushed, thereby extending a lifespan of the reverse osmosis filter 250.

In a case in which domestic water supplied through the chamber water line LLW is supplied to the second chamber 320, a volume of the second chamber 320 is increased, thereby allowing purified water accommodated in the first chamber 310 to be discharged.

Purified water discharged from the first chamber 310 flows into the purified water branch portion TC2 through the purified water supply line LPW1 and passes through the purified water discharge lines LPW2 and LPW3, the extraction line LE, and the extraction connection line LCE, together with purified water that has been filtered in the reverse osmosis filter 250, to be supplied to a user in the extraction portion 700.

As such, since purified water is discharged by hydraulic pressure, in a case in which the reverse osmosis filter 250 is used, purified water is easily outwardly discharged, and the extraction of purified water is facilitated, regardless of a position in which the extraction portion 700 is disposed.

In the meantime, water flows in the reverse direction in the pressure reducing valve 600 in the process of extracting purified water, and the elastic member 650 is maintained in a state of being tensioned to a maximum extent thereof, so that water may flow without flow path resistance. However, in a case in which purified water of the first chamber 310 is completely discharged, and the second chamber 320 is completely filled with water, the elastic member 650 is compressed to the maximum extent thereof, so that the closing member 660 may close the opening 621 of the internal body portion 620, as illustrated in FIG. 29. Thus, the pressure reducing valve 600 may further act as a safety device preventing damage to the housing 330 by blocking a flow path between the second chamber 320 and the third port 413 of the flow path conversion valve 400.

EXAMPLES OF FIGS. 5 AND 6

Subsequently, with reference to FIGS. 5 and 6, the water treatment apparatus 100 according to another example will be described.

FIG. 5 is a piping diagram of a water treatment apparatus according to an example, and FIG. 6 is a piping diagram of a modified example of the water treatment apparatus illustrated in FIG. 5.

The example illustrated in FIG. 5 is the same as that illustrated in FIG. 1, except that the first filter 210 and the second filter 220 are disposed as a single composite filter, and the pressure reducing valve 600 is excluded, in the example illustrated in FIG. 1. In addition, an example illustrated in FIG. 6 is the same as that illustrated in FIG. 4 except that the first filter 210 and the second filter 220 are disposed as a single pretreatment composite filter 210', and the pressure reducing valve 600 is excluded, in the example illustrated in FIG. 4.

Thus, in order to avoid unnecessarily repetitive descriptions, a description thereof, the same as or similar to a description provided above, will be omitted, and only differences therebetween will be described.

In the case of the examples illustrated in FIGS. 5 and 6, the first filter 210 and the second filter 220 illustrated in FIGS. 1 and 4 are formed as the pretreatment composite filter 210'. For example, the pretreatment composite filter 210' may be configured as a composite filter of a sediment filter and a pre-carbon filter, but is not limited thereto.

As such, in a case in which the pretreatment composite filter 210' is provided, the number of filters disposed in the filtering portion 200 may be reduced. Thus, piping to connect a filter may be simpler, and spatial efficiency may also be expected.

In addition, the examples illustrated in FIGS. 5 and 6 have structures in which the pressure reducing valve 600 illustrated in FIGS. 1 and 4 is omitted. However, the examples illustrated in FIGS. 5 and 6 include the flow path conversion valve 400 and the automatic shut-off valve 500. Thus, a flow path may be converted by hydraulic pressure, while an introduction of raw water may be automatically blocked by pressure of the extraction line LE. Since the example illustrated in FIG. 6 includes the air supply portion AP, water may be drained from the storage portion 300, a leakage test of the storage portion 300 and/or a flow path is possible, and a determination of whether there is a defect in a component disposed on a flow path may be made.

EXAMPLES OF FIGS. 7 AND 8

Subsequently, with reference to FIGS. 7 and 8, the water treatment apparatus 100 according to another example will be described.

FIG. 7 is a piping diagram of a water treatment apparatus according to another example, while FIG. 8 is a piping diagram of a modified example of the water treatment apparatus illustrated in FIG. 7.

Examples illustrated in FIGS. 7 and 8 are the same as examples illustrated in FIGS. 5 and 6, except that the additional filter 260 is disposed between the first check valve CV1 and the purified water branch portion TC2, and the additional filter 260 and the purified water branch portion TC2 are connected through a purified water connection line LPW4, in examples illustrated in FIGS. 5 and 6.

Thus, in order to avoid unnecessarily repetitive descriptions, a description thereof, the same as or similar to a description provided above, will be omitted, and only differences therebetween will be described.

In the examples illustrated in FIGS. 7 and 8, since the additional filter 260 is disposed between the first check valve CV1 and the purified water branch portion TC2, purified water that has been filtered by passing through the additional filter 260 is supplied to the first chamber 310 of the storage portion 300 or supplied to a user through the extraction portion 700.

In detail, in the case of the examples illustrated in FIGS. 7 and 8, when purified water is extracted, purified water accommodated in the first chamber 310 is supplied to a user through the purified water supply line LPW1, the purified water discharge lines LPW2 and LPW3, the extraction line LE, and the extraction connection line LCE. Thus, purified water discharged from the first chamber 310 may be discharged through the extraction portion 700 without passing through a filter.

Thus, in the case of the examples illustrated in FIGS. 7 and 8, compared with examples illustrated in FIGS. 1 to 6, differential pressure loss generated in a case in which purified water passes through the additional filter 260 when purified water is extracted may be mitigated.

EXAMPLES OF FIGS. 9 TO 12

Subsequently, with reference to FIGS. 9 to 12, the water treatment apparatus 100 according to another example will be described.

FIG. 9 is a piping diagram of a water treatment apparatus according to another example, FIG. 10 is a piping diagram illustrating the flow path of the water treatment apparatus illustrated in FIG. 9 when purified water is stored, FIG. 11 is a piping diagram illustrating the flow path of the water treatment apparatus illustrated in FIG. 9 when purified water is extracted, and FIG. 12 is a piping diagram of a modified example of the water treatment apparatus illustrated in FIG. 9.

Examples illustrated in FIGS. 9 to 12 are the same as an example illustrated in FIG. 1, except that the first filter 210 and the second filter 220 are disposed as a single composite filter, the pressure reducing valve 600 is excluded, and a position of the chamber water line LLW is changed, in the example of FIG. 1.

Thus, in order to avoid unnecessarily repetitive descriptions, a description thereof, the same as or similar to a description provided above will be omitted, and only differences therebetween will be described. However, the examples illustrated in FIGS. 9 to 12 are the same as the examples illustrated in FIGS. 5 and 6 in that the first filter 210 and the second filter 220 are disposed as a single pretreatment composite filter 210', and the pressure reducing valve 600 is excluded. Thus, a detailed description thereof will be omitted, and only a change in the position of the chamber water line LLW will be described.

The examples illustrated in FIGS. 9 to 11 have a configuration in which raw water is supplied to the second chamber 320. An example illustrated in FIG. 12 has a configuration in which purified water that has been filtered by passing through at least a portion of filters disposed in the filtering portion 200 or water that has not passed through the reverse osmosis filter 250 flows into the second chamber 320.

In detail, in the case of the examples illustrated in FIGS. 9 to 11, the chamber water line LLW connected to the first port 411 of the flow path conversion valve 400 to supply water to the second chamber 320 of the storage portion 300 is divided in the raw water line LRW. In other words, raw water of the raw water line LRW is divided in a raw water branch portion TC4 and passes through the chamber water line LLW and then flows into the second chamber 320 of the storage portion 300 or flows into the pretreatment composite filter 210' to be filtered.

In addition, in the case of the example illustrated in FIG. 12, raw water introduced from the raw water line LRW is filtered in the pretreatment composite filter 210', is divided in the raw water branch portion TC4, and passes through the chamber water line LLW and then flows into the second chamber 320 of the storage portion 300 or flows into the reverse osmosis filter 250 to be filtered.

A flow path when purified water is stored and a flow path when purified water is extracted in an example of FIG. 9 are substantially the same as examples illustrated in FIGS. 2 and 3, except for the position of the chamber water line LLW, and will be briefly summarized below.

First, with reference to FIG. 10, raw water introduced from the raw water line LRW, when purified water is stored, is filtered by passing through the pretreatment composite filter 210' and the reverse osmosis filter 250 and passes through the purified water line LPW and the purified water supply line LPW1, to be stored in the first chamber 310 of the storage portion 300. Since purified water is stored in the first chamber 310, water accommodated in the second chamber 320 passes through the entrance line LEI and the third port 413, and the second port 412 of the flow path conversion valve 400 to be drained to a drain pipe through a drain connection line. In this case, in the flow path conversion valve 400, the first port 411 is closed, and the third port 413 is in communication with the second port 412, in the same manner as in the case of FIG. 2. In addition, domestic water that has not passed through the reverse osmosis filter 250 is drained through the drain line LD. In the same manner as in the case of FIG. 2, in a case in which the first chamber 310 of the storage portion 300 is filled with purified water, pressure of the extraction line LE is increased, to be higher than or equal to the set pressure, and the automatic shut-off valve 500 closes the connection line LC to block an introduction of raw water.

With reference to FIG. 11, in a case in which purified water is extracted by opening the extraction portion 700 when purified water is extracted, pressure of the extraction line LE is reduced, and the automatic shut-off valve 500 is opened, so that raw water flows thereinto. In addition, pressure of the extraction line LE and the extraction connection line LCE is reduced by opening the extraction portion 700. Thus, the third port 413 of the flow path conversion valve 400 is closed, and a flow path allowing the first port 411 to be in communication with the second port 412 is formed.

Thus, raw water introduced from the raw water line LRW passes through the pretreatment composite filter 210' and the reverse osmosis filter 250, is filtered, passes through the purified water line LPW, the purified water discharge lines LPW2 and LPW3, the extraction line LE, and the extraction connection line LCE, and is supplied to a user in the extraction portion 700.

In the meantime, domestic water that has not passed through the reverse osmosis filter 250 is discharged outwardly through the drain pipe.

In addition, since the flow path allowing the first port 411 to be in communication with the second port 412 is formed in the flow path conversion valve 400, raw water flows into the first port 411 of the flow path conversion valve 400 through the chamber water line LLW and is supplied to the second chamber 320 through the entrance line LEI connected to the third port 413. Since raw water is supplied to the second chamber 320, purified water accommodated in the first chamber 310 passes through the purified water supply line LPW1, the purified water discharge lines LPW2 and LPW3, the extraction line LE, and the extraction connection line LCE, and is supplied to a user in the extraction portion 700.

As such, the examples illustrated in FIGS. 9 to 12 have a configuration in which raw water or purified water that has been filtered by passing through a filter in a front portion of the reverse osmosis filter 250 is supplied to the second chamber 320. Thus, loss of hydraulic pressure may be minimized, thereby enabling the use of hydraulic pressure in extracting purified water accommodated in the first chamber 310. Specifically, since hydraulic pressure or a relatively high level of pressure similar to the hydraulic pressure is used in this case, purified water accommodated in the first chamber 310 may be extracted rapidly. Thus, an extraction amount per hour extracted by the extraction portion 700 is increased.

EXAMPLES OF FIGS. 13 TO 15

Subsequently, with reference to FIGS. 13 to 15, the water treatment apparatus 100 according to another example will be described.

FIG. 13 is a piping diagram of a water treatment apparatus according to another example, FIG. 14 is a piping diagram illustrating the flow path of the water treatment apparatus illustrated in FIG. 13, when purified water is stored, and FIG. 15 is a piping diagram illustrating the flow path of the water treatment apparatus illustrated in FIG. 13, when purified water is extracted.

Examples illustrated in FIGS. 13 to 15 have a difference in position and detailed operations of the automatic shut-off valve 500, compared with an example illustrated in FIG. 4. In addition, the examples illustrated in FIGS. 13 to 15 are the same as the example illustrated in FIG. 4, except that the pressure transfer line LP is not provided.

Thus, in order to avoid unnecessarily repetitive descriptions, a description thereof, the same as or similar to a description provided above, will be omitted, and only differences related to the automatic shut-off valve 500 will be described.

In the case of the examples illustrated in FIGS. 13 to 15, the automatic shut-off valve 500 is configured to block an introduction of raw water when pressure in a flow path disposed in an interior of the filtering portion 200 is higher than or equal to the set pressure.

In detail, the automatic shut-off valve 500 includes the first flow path portion 531, connected to the drain line LD, through which domestic water that has not passed through the reverse osmosis filter 250 is discharged, and includes the second flow path portion 521, in which purified water that has been filtered by passing through at least a portion of filters disposed in the filtering portion 200 flows.

In other words, the first port 411 and the second port 412 of the automatic shut-off valve 500 are connected to the drain line LD, through which domestic water that has not passed through the reverse osmosis filter 250 is discharged. The third port 413 and the fourth port 424 are disposed in the purified water line LPW, in which purified water that has been filtered by passing through the reverse osmosis filter 250 flows.

In addition, the first check valve CV1, to prevent purified water from flowing back from the automatic shut-off valve 500 to the reverse osmosis filter 250, is disposed between the reverse osmosis filter 250 and the automatic shut-off valve 500.

With reference to FIG. 14, raw water introduced from the raw water line LRW when purified water is stored, is filtered in the reverse osmosis filter 250 after passing through the pretreatment composite filter 210'.

Purified water that has been filtered by passing through the reverse osmosis filter 250, passes through the first check valve CV1, disposed in the purified water line LPW and the third port 413 and the fourth port 424 of the automatic shut-off valve 500, to reach the purified water branch portion TC2. Since the extraction portion 700 is closed, purified water passes through the purified water supply line LPW1 to flow into the first chamber 310 of the storage portion 300.

In addition, domestic water that has not passed through the reverse osmosis filter 250 passes through the drain valve VR to be discharged through the drain line LD.

In a case in which pressure of the extraction line LE is higher than or equal to the set pressure due to an increase in pressure of the first chamber 310, or the like, the first port 411 of the flow path conversion valve 400 is closed, and a flow path allowing the third port 413 to be in communication with the second port 412 is formed. Thus, water accommodated in the second chamber 320 passes through the entrance line LEI and the third port 413 and the second port 412 of the flow path conversion valve 400, to be discharged into the drain connection line. Finally, the water is drained through the drain line LD.

In addition, in a case in which the first chamber 310 of the storage portion 300 is filled with a specific amount of purified water, thereby increasing pressure of the first chamber 310, pressure of the purified water supply line LPW1 and the purified water line LPW connected thereto is increased. With reference to FIG. 24, in a case in which pressure of the purified water line LPW is increased to be higher than or equal to the set pressure, pressure of the second flow path portion (see 521 of FIG. 24) between the third port 413 and the fourth port 424 of the automatic shut-off valve 500 is increased. Thus, the second diaphragm DPU is moved toward the first flow path portion 531, thereby closing the first flow path portion 531 between the first port 411 and the second port 412.

In this case, since the first flow path portion 531 is connected to the drain line LD, in a case in which pressure of the purified water line LPW connected to the second flow path portion 521 is increased, the automatic shut-off valve 500 is operated, thereby closing the drain line LD.

Thus, since domestic water that has not passed through the reverse osmosis filter 250 may not be discharged through the drain line LD, purified water that has passed through the reverse osmosis filter 250 fills a flow path connected to the purified water line LPW and the first chamber 310, and draining domestic water is limited by the automatic shut-off valve 500. Thus, raw water of the purified water line LPW may not flow into the water treatment apparatus 100, and a process of purifying water is finished. In addition, since the first check valve CV1 is disposed between the third port 413 of the automatic shut-off valve 500 and the reverse osmosis filter 250, pressure of the purified water line LPW may be maintained, thereby maintaining a state in which the automatic shut-off valve 500 closes the drain line LD.

With reference to FIG. 15, a process of extracting purified water will be described below.

In a case in which purified water is extracted by opening the extraction portion 700 when purified water is extracted, pressure of the extraction line LE is reduced, thereby reducing pressure of the purified water line LPW. Thus, closure of the drain line LD of the automatic shut-off valve 500 ends, and raw water flows into the automatic shut-off valve 500. In addition, pressure of the extraction line LE and the extraction connection line LCE is reduced by opening the extraction portion 700, so that the third port 413 of the flow path conversion valve 400 is closed, and a flow path allowing the first port 411 to be in communication with the second port 412 is formed.

Thus, raw water introduced from the raw water line LRW passes through the pretreatment composite filter 210' and the reverse osmosis filter 250, is filtered, passes through the purified water line LPW, the purified water discharge lines LPW2 and LPW3, the extraction line LE, and the extraction connection line LCE, and is supplied to a user in the extraction portion 700.

In the meantime, domestic water that has not passed through the reverse osmosis filter 250 is discharged outwardly through the drain pipe.

In addition, since the flow path allowing the first port 411 to be in communication with the second port 412 is formed in the flow path conversion valve 400, most of domestic water that has not passed through the reverse osmosis filter 250 flows into the first port 411 of the flow path conversion valve 400 through the chamber water line LLW, to be supplied to the second chamber 320 through the entrance line LEI connected to the third port 413. Since raw water is supplied to the second chamber 320, purified water accommodated in the first chamber 310 passes through the purified water supply line LPW1, the purified water discharge lines LPW2 and LPW3, the extraction line LE, and the extraction connection line LCE, to be supplied to a user in the extraction portion 700.

As such, in the case of the examples illustrated in FIGS. 13 to 15, in a manner different from examples illustrated in FIGS. 1 to 11, the automatic shut-off valve 500 is disposed in the drain line LD, through which domestic water is discharged, thereby mitigating differential pressure loss by the automatic shut-off valve 500 when purified water is extracted.

As described above, in a case in which the water treatment apparatus 100 according to an example is used, purified water that has been filtered by the reverse osmosis filter 250 is stored in the first chamber 310 of the storage portion 300 by a single flow path conversion valve 400, or domestic water or raw water that has not been filtered by the reverse osmosis filter 250 or purified water that has been filtered by passing through a filter flows into the second chamber 320, so that purified water stored in the first chamber 310 may be discharged. Thus, even in the case in which the reverse osmosis filter 250 is used, purified water may be easily outwardly discharged, and a position of the extraction portion 700 may not be limited.

In addition, back pressure may not be applied to the reverse osmosis filter 250. An amount of purified water that has been filtered in the reverse osmosis filter 250 and discharged therefrom may not be reduced, while filtering efficiency may not be decreased.

While exemplary embodiments have been shown and described above, it will be apparent to those skilled in the art that modifications and variations could be made without departing from the scope of the present invention as defined by the appended claims.

DESCRIPTION OF REFERENCE NUMERALS

100 . . . water treatment apparatus
200 . . . filtering portion
210 . . . first filter
220 . . . second filter
250 . . . reverse osmosis filter (third filter)
260 . . . additional filter
300 . . . storage portion
310 . . . first chamber
320 . . . second chamber
330 . . . housing
340 . . . partition member
400 . . . flow path conversion valve
410 . . . first body portion
411 . . . first port
412 . . . second port
413 . . . third port
414 . . . moving portion
415 . . . pressure transfer portion
420 . . . second body portion
421 . . . connection flow path
421a . . . connection hole
424 . . . fourth port
425 . . . fifth port
430 . . . plunger
431 . . . elastic member
440 . . . pressing portion
441 . . . pressing member
442 . . . first diaphragm
443 . . . second diaphragm
500 . . . automatic shut-off valve
511 . . . first port
512 . . . second port
513 . . . third port
514 . . . fourth port
520 . . . second body portion
521 . . . second flow path portion
522 . . . communication hole
530 . . . first body portion
531 . . . first flow path portion
540 . . . blocking member
541 . . . elevating member
542 . . . guide member
550 . . . capping member
DPL . . . first diaphragm
DPU . . . second diaphragm
600 . . . pressure reducing valve
611 . . . first entrance
612 . . . second entrance
620 . . . internal body portion
630 . . . external body portion
640 . . . moving member
650 . . . elastic member
660 . . . closing member
700 . . . extraction portion
LRW . . . raw water line
LC . . . connection line
LPW . . . purified water line
LPW1 . . . purified water supply line
LPW2, LPW3 . . . purified water discharge line
LPW4 . . . purified water connection line
LE . . . extraction line
LCE . . . extraction connection line
LLW . . . chamber water line
LD . . . drain line
LDS . . . drain connection line
LEI . . . entrance line LEI
LP . . . pressure transfer line
TC1 . . . drain connection portion
TC2 . . . purified water branch portion TC3 . . . pressure line connection portion
TC4 . . . raw water branch portion
CV1 . . . first check valve
CV2 . . . second check valve
REG . . . raw water pressure reducing valve
VR . . . drain valve
OR, OR2 . . . sealing member

The invention claimed is:

1. A water treatment apparatus, comprising:
a filtering unit including at least two filters, each configured to filter raw water;
a storage member including a first chamber and a second chamber, the first chamber configured to store purified water that has been filtered by passing through the filtering unit, and the second chamber configured to store concentrated water having not passed through a reverse osmosis filter of the filtering unit, wherein a volume of the second chamber is reduced when the purified water is supplied to the first chamber and a volume of the first chamber is reduced when the concentrated water is supplied to the second chamber;
an extracting member configured to supply the purified water to a user;
an air supply conduit disposed on a flow path connected to the first chamber of the storage member, and configured to supply air to the first chamber of the storage member; and
a flow path conversion valve configured to convert the flow path to allow flow of the purified water into the first chamber or allow discharge of the purified water from the first chamber,
wherein the purified water moves from the first chamber to the extracting member in response to a pressure in an extraction line supplying the purified water to the extracting member being lower than a set pressure, and the purified water moves into the first chamber in response to the pressure of the extraction line being greater than or equal to the set pressure,
wherein the purified water is supplied to the first chamber in use, and air is alternatively supplied to the first chamber to empty the second chamber of water,
wherein, when the concentrated water is supplied to the second chamber, the purified water stored in the first chamber is supplied to the user via the extracting member, and when the purified water is supplied to the first chamber, the concentrated water stored in the second chamber is drained through a drain line, and
wherein, when air is supplied to the first chamber through the air supply conduit after the purified water stored in the first chamber is discharged through the extracting member, the volume of the first chamber is increased and the volume of the second chamber is reduced as the first chamber is filled with air, and water accommodated in the second chamber is discharged by reducing the volume of the second chamber, thereby emptying the second chamber of water.

2. The water treatment apparatus of claim 1, wherein the air supply conduit is directly disposed in a purified water branch portion in which a purified water line disposed at a front stage of the purified water branch portion and supply of the purified water to the first chamber is divided into a flow path connecting the purified water branch portion and the extracting member.

3. The water treatment apparatus of claim 2, wherein the purified water line comprises a first check valve configured to prevent purified water from flowing back from the purified water branch portion to the filtering unit.

4. The water treatment apparatus of claim 3, wherein an additional filter is disposed between the first check valve and the purified water branch portion, and
wherein the additional filter is configured to filter the purified water that has passed through the first check valve.

5. The water treatment apparatus of claim 2, wherein a second check valve configured to prevent the purified water from flowing back toward the first chamber is disposed on a flow path connecting the purified water branch portion and the extracting member.

6. The water treatment apparatus of claim 5, wherein an additional filter is disposed between the second check valve and the extracting member, in a purified water discharge line connecting the purified water branch portion to the extracting member.

7. The water treatment apparatus of claim 6, wherein the additional filter is configured to further filter the purified water.

8. The water treatment apparatus of claim 2, further comprising a shut-off valve configured to block a flow of raw water into the filtering unit in response to the pressure in the extraction line being greater than or equal to the set pressure,
wherein the extracting member is connected to the shut-off valve by a pressure transfer line.

9. The water treatment apparatus of claim 1, wherein the first chamber and the second chamber are separated by a flexible partition within the storage member.

10. The water treatment apparatus of claim 1, wherein the flow path conversion valve comprises a first body portion including a first port connected to the reverse osmosis filter of the filtering unit, a second port connected to the drain line, and a third port connected to the second chamber, and a second body portion connected to the extraction line.

11. The water treatment apparatus of claim 1, wherein the flow path conversion valve comprises a plurality of ports, and a flow path is converted by pressure of water supplied from the filtering unit.

12. The water treatment apparatus of claim 1, wherein the flow path conversion valve is configured to convert a flow path depending on the pressure in the extraction line.

* * * * *